United States Patent [19]
Sekiguchi et al.

[11] Patent Number: 5,715,008
[45] Date of Patent: Feb. 3, 1998

[54] MOTION IMAGE DECODING METHOD AND APPARATUS FOR JUDGING CONTAMINATION REGIONS

[75] Inventors: Shunichi Sekiguchi; Kohtaro Asai, both of Tokyo, Japan

[73] Assignee: Mitsubishi Denki Kabushiki Kaisha, Tokyo, Japan

[21] Appl. No.: 675,324

[22] Filed: Jul. 10, 1996

[30] Foreign Application Priority Data

Mar. 7, 1996 [JP] Japan ............................. 8-050479

[51] Int. Cl.$^6$ ............................................. H04N 7/32
[52] U.S. Cl. ................................... 348/416; 348/699
[58] Field of Search ........................... 348/384, 390, 348/400–402, 407, 409–413, 415, 416, 420, 699; 382/232, 236, 238; H04N 7/137

[56] References Cited

U.S. PATENT DOCUMENTS

| | | | |
|---|---|---|---|
| 4,307,420 | 12/1981 | Ninomiya et al. | 348/413 |
| 5,117,288 | 5/1992 | Eisenhardt et al. | 348/409 |
| 5,122,876 | 6/1992 | Aoki | 348/413 |
| 5,136,371 | 8/1992 | Savatier et al. | 348/409 |
| 5,585,933 | 12/1996 | Ichige et al. | 348/390 |

FOREIGN PATENT DOCUMENTS

| | | |
|---|---|---|
| 2-162887 | 6/1990 | Japan . |
| 5-130420 | 5/1993 | Japan . |
| 5-300485 | 11/1993 | Japan . |
| 7-038888 | 2/1995 | Japan . |

OTHER PUBLICATIONS

Zhang et al, "Performance of MPEG Codecs in the Present of Errors", SPIE Visual Communications and Image Processing '93, pp. 1739–1749, 1993.

S. H. Lee et al, "Transmission Error Detection, Resynchronization, and Error Concealment for MPEG Video Decoder", SPIE Visual Communications and Image Processing '93, pp. 195–200, 1993.

H. Sun et al, "Adaptive Error Concealment Algorithm for MPEG Compressed Video", SPIE Visual Communications and Image Processing '92, pp. 814–824, Nov. 1992.

ISO/IEC Recommendation ITU-T 1995.

Primary Examiner—Richard Lee
Attorney, Agent, or Firm—Wolf, Greenfield & Sacks, P.C.

[57] ABSTRACT

If an error is detected during the decoding of motion image data a portion of the image is lost and image quality deteriorates even after correction. When motion compensation prediction is used the image quality of subsequent pictures can also be adversely affected. This apparatus has a bit stream analysis portion for analyzing each macro block of a moving image, a contaminated region registering portion for registering a region as a contaminated region if an error has been detected during analysis, a motion vector selection portion for determining a predicted image to be used for motion compensation prediction, a contaminated region judging portion for judging whether or not a predicted image is contaminated and a loop filter portion for filtering a predicted image which is contaminated, so that it is smoother for decoding.

14 Claims, 18 Drawing Sheets

MOTION IMAGE DECODING METHOD AND APPARATUS FOR JUDGING CONTAMINATION REGIONS

BACKGROUND OF THE INVENTION

1. Field of the Invention

The present invention relates generally to a motion image decoding method and an apparatus for decoding coded motion image data, and more particularly to a method of decoding coded motion image data using motion compensation prediction and to a motion image decoding apparatus employing this method.

2. Description of the Prior Art

Motion images generally have large levels of temporal and spatial redundance. In digital high efficiency coded technology, redundancy is removed using such methods as motion compensation prediction and DCT (Discrete Cosine Transformation) and thereafter quantization is carried out and algorithms are often used for variable-length coding of the quantization values and motion vectors to correspond with the generation frequency. Such algorithms are also used in international standard coding systems prescribed by ITU-TH.261 and MPEG (ISO/IEC11172-2, 13818-1).

However in the event of some kind of malfunction during processing when sending, recording or reading data which has been coded with such algorithms, decoding errors can occur, such as, an inability to analyze variable-length codes or coded parameters with incorrect values. Errors can lead to a partial loss of a decoded image. In the case where motion compensation prediction is being used, this loss can also adversely affect the decoded images which follow.

In order to avoid this condition, decoding apparatuses often include an error concealment function which restores any lost image data with image data thought to be similar to the lost image. Recently, there have been many proposals regarding error concealment algorithms. The majority of these are divided into those which spatially restore a lost portion using the data of closely positioned regions within a single picture (spatial concealment) and those which temporally substitute a lost portion according to past or future image data which remains within the frame memory (temporal concealment). A picture is a unit of an image and is a concept which includes a frame and field.

Spatial concealment implements the proposition that "spatially adjacent small regions (pixels, blocks etc.) generally resemble one another (have a high correlation)," and, for example, in "Performance of MPEG Codes in the Presence of Errors" (Y. Q. Zhang and X. Lee, 1993) in SPIE Visual Communications and Image Processing '93, a macro block which has lost the information for motion compensation prediction due to an error (hereinafter referred to as a "lost macro block") is replaced based on the average DC values of all the correctly decoded macro blocks in close proximity to it.

Temporal concealment implements the proposition that "motion between temporally close pictures is small (i.e. temporal correlation is high) and spatially adjacent regions move in a similar way." For instance, in "Transmission Error Detection, Resynchronization and Error Concealment for MPEG Video Decoder" (S. H. Lee et al., 1993) in SPIE Visual Communications and Image Processing '93, a method is demonstrated wherein the motion vector of a lost micro block is estimated from the motion vector of a correctly decoded block in close proximity, the estimated motion vector is used to determine a predicted image from past or future images and the lost micro block is substituted.

These concealment technologies utilize general properties of motion images, and depending on the type of motion image, even if used independently, results are not always satisfactory. Methods have therefore been proposed for dynamically dealing with the properties of a variety of motion images and for switching between concealment processes as the case demands. For instance, in the technique proposed in "Adaptive Error Concealment Algorithm for MPEG Compressed Video" (H. Sun et al., 1992) in SPIE Visual Communications and Image Processing '92, the spatial and temporal correlation of blocks in close proximity to a block which is to be concealed are determined and based on these correlation ratios, switching is carried out between spatial concealment and temporal concealment.

The above refers to decoding technology, but measures can also be taken to reduce the effects of errors in coding. In motion images, since propagation of the effect of loss in the temporal direction is particularly serious, closed intra-coding is often periodically carried out within a picture itself without carrying out motion compensation prediction, i.e. periodic refreshing is carried out.

FIG. 1 is a figure depicting the conditions when coding is carried out using MPEG 1 or MPEG 2 and shows error propagation in the temporal direction generated when decoding. Here an I picture, which is the target of closed coding within the picture itself, is periodically inserted. As a result, even if loss occurs, when the following I picture arrives, the effect of the loss will not be visible and the error resistance of the motion image decoding sequence as a whole will be improved. In the case where there is no I picture, the loss effect gradually spreads, as shown in FIG. 1. In addition, there is another technique, known as intra-slice, in which a group of macro blocks which have been intra-coded is periodically inserted.

Since prediction coding such as DPCM (Differential Phase Code Modulation) is often carried out within a single picture, DPCM includes a periodic reset unit so as to avert propagation of the effects of spatial loss. This unit corresponds for instance to the slice defined with MPEG 1 or MPEG 2 in FIG. 2. FIG. 2 also shows the condition of error propagation in the temporal direction generated when decoding. It also shows cases in which an example macro block is comprised of 1 slice (A) and of 2 slices (B). In B, since the loss extent range is lessened when the length of the slice is shortened, it is possible to reset errors caused by DPCM and to decrease the propagation of the effect of spatial direction loss.

Error concealment processing is carried out for bit errors which cannot be corrected by error correction processing and its purpose is to limit image loss to a minimum.

However, image data that has been concealed can still be unlike previous image data, so that, in the subsequent picture, after carrying out motion compensation prediction based on a concealed image region, the predicted image is also unlike previous prediction images. Consequently temporal propagation of image quality deterioration occurs. Even when an I picture or an intra-slice is provided, errors can be generated when these are decoded. As such, I pictures and the like cannot be satisfactorily relied upon.

The principal objective of previous decoding error processing has been how to carry out concealment processing as precisely as possible. The fundamental idea is based on the fact that the image quality of a play-back image of a picture which has been processed is improved when the processing is more precise. However, in actual practice errors invariably arise in the concealment process. Whenever motion compensation prediction is carried out, adverse effects resulting from these errors will spread.

SUMMARY OF THE INVENTION

It is therefore the object of the present invention to restrict the spatial and temporal effects of errors which accompany concealment processing after confirming the existence of such errors in concealment processing, while in order to improve the image quality of a play-back image of a picture upon which that concealment processing has been performed.

(1) The motion image decoding method of the present invention is a method for decoding coded motion image data using motion compensation prediction, including an analysis process for analyzing a motion image at each processing unit image (see below), a registering process for registering a region of a processing unit image as a contaminated region when an error has been detected during analysis of a processing unit image, a determining process for determining a predicted image to be used for motion compensation prediction when a processing unit image is decoded, a judging process for judging if a predicted image is included in said contaminated region, and a smoothing process for smoothing a predicted image when said predicted image has been judged to be included in said contaminated region.

"Processing unit image" here refers to an image which is a processing unit when an image is decoded, for instance an MPEG macro block. Motion image data are coded in accordance with, for instance, ITU-TH. 261, ISO/IEC 11172-2 (i.e. MPEG 1), ISO/IEC 13818-2 (i.e. MPEG 2). "Analysis" refers to the reading of motion image data received, for instance, in a bit stream format, and is usually carried out at the first stage of decoding processing. In cases where motion image data includes an unreadable bit row, an error is detected. "Contaminated region" refers to a motion image region which suffers some type of adverse effect as a result of said error. "Predicted image" is an image used in motion compensation prediction, for instance, when decoding a given macro block included in a given picture, when the region of the immediately preceding picture corresponding to the region of this macro block is identified, the region of the immediately preceding picture is equivalent to the region of the predicted image of the macro block during decoding.

With the above configuration, motion image data is input and analyzed for every processing unit image. If no error is detected during analysis, decoding is carried out as usual. However if an error is detected, the region of the processing unit image in which the error has been detected is registered as a contaminated region.

Separate from this registering process, when a given processing unit image is decoded, a predicted image is determined for use in motion compensation prediction. Here, it is judged if the determined predicted image is included in the said contaminated region, and if so, a smoothing process is performed on the prediction image. Thereafter, it is used as a predicted image of the processing unit image during decoding and a decoded image is obtained. Filtering using a low-pass filter is an example of such a smoothing process.

Since a predicted image which is included in a contaminated region is smoothed, a state situation wherein the predicted image gives a distinctly dissimilar impression from other portions of the image is avoided. Since subsequent pictures are decoded from this state, spatial or temporal deterioration in image quality is reduced.

The above method, can also produce a visually satisfactory play-back image even if an uncorrectable bit error becomes mixed in. As a result, since there is no dependence on coded bit-stream formats, (formats stipulated by H. 261, MPEG 1, MPEG 2 and the like) the range of application is wide.

(2) In one aspect of the present invention, the registering process registers both 1) a region of a processing unit image in which an error has been detected and 2) previous contaminated region for which motion compensation prediction has been carried out using a predicted image as contaminated regions. The purpose of 1) is to note the existence or non-existence of an error in a picture presently being decoded when decoding later picture while 2) registers a warning for cases in which although no error has been detected in the picture presently being decoded, an error was registered as having occurred in a previous picture may have spread to the image which is currently being decoded. The warning is used when decoding subsequent pictures. By this method, the propagation of adverse effects due to an error can be reduced.

(3) The motion image decoding apparatus of the present invention is an apparatus for decoding coded motion image data using motion compensation prediction, including a bit stream analysis portion for analyzing each processing unit image of received motion image data, a contaminated region registering portion for registering a region of a processing unit image as a contaminated region when an error has been detected during analysis, a predicted image determining portion for determining a predicted image to be used for motion compensation prediction when a processing unit image is decoded, a contamination judging portion for judging if a predicted image is contaminated by comparing a region of a determined predicted image with said contaminated region, and a smoothing portion for smoothing a predicted image when said predicted image has been judged to be included in said contaminated region. The operation principles of this apparatus are as described in (1).

Using this apparatus, received motion image data can be decoded and a play-back image obtained, with the added feature that visually satisfactory play-back image can now be obtained even if an uncorrectable bit error has become mixed in.

(4) In one aspect of the present invention, the said predicted image determining portion carries out motion compensation prediction using the motion vector for each processing unit image and, where necessary, determines a predicted image for a processing unit image, which has lost its motion vector due to some error, based on the motion vector of a processing unit image which is in close proximity. As such, motion image data which has been lost can be restored.

(5) In another aspect of the present invention, the present apparatus also includes a picture counting portion for counting the number of decoded pictures and when the number of pictures counted has reached a designated value, the said contaminated region registering portion de-registers the contaminated region. Since de-registering returns the state to one in which a region is assumed to be uncontaminated, the said smoothing processing is not carried out, and accordingly, excessive smoothing can be prevented.

(6) In another aspect of the present invention, the said contaminated region registering portion registers both processing unit images in which an error has been detected, and also image regions for which motion compensation prediction has been carried out using a predicted image in a previous contaminated region. The principle of this operation is the same as that explained in (2). As a result the propagation of adverse effects due to an error can be reduced.

(7) In another aspect of the present invention, the said contamination judging portion judges the existence of contamination from the level of overlap between the said predicted image and the said contaminated region. The proportion of the predicted image within a contaminated region can be considered an example of "level of overlap." In other words, when the proportion of the predicted image within a contaminated region is high, this predicted image is easily judged to be contaminated. In this invention, since the standard used when judging a contaminated region can be set as the threshold (TH) used in the judgment equation, a play-back image can be obtained that is best-suited to the conditions.

(8) In another aspect of the present invention, the relevant apparatus includes a loss image extent determining portion for determining at the time when an error has been detected, not only the processing unit image in which the error has been detected, but also the extent of the image region in which the processing unit image has lost its motion vector as a result of the error, and the said contaminated region registering portion registers this entire image region as a contaminated region. A contaminated region can thus be accurately tracked and deterioration of image quality can be reduced.

(9) In another aspect of the present invention, the present apparatus includes a contaminated region memory portion for use with decoding pictures (decoding memory) and a contaminated region memory portion for use with prediction pictures (predicted memory), and if an error is detected in a picture presently being decoded, the said contaminated region registering portion registers the processing unit image in which the error has been detected in the contaminated region memory portion for use with decoding pictures, and switches the contaminated region memory portion for use with decoding pictures with the contaminated region memory portion for use with prediction pictures when the decoding processing has proceeded to the next picture. "Decoding picture" refers to a picture during decoding and "prediction picture" refers to a picture including in a prediction image.

Once a picture has been decoded, any error detected in the picture should be referred to when the next picture is decoded. To this end, the contaminated region memory portion for use with decoding pictures is first switched to the contaminated region memory portion for use with prediction pictures. Since the original contaminated region memory portion for use with prediction pictures is empty at this point, it is switched to the contaminated region memory portion for use with decoding pictures. Thereafter this switching is repeated each time a picture is decoded. As one example, a configuration is possible in which the contaminated region memory portion for use with decoding pictures is used solely for registering, and the contaminated region memory portion for use with prediction pictures is used solely for reading. Thus by switching these as appropriate, registration and reference to contaminated regions is possible even with a small memory capacity.

(10) In a final aspect of the present invention, the present apparatus includes a picture configuration judging portion for judging whether the configuration of a picture is in frame format or in field format, and a picture configuration converting portion for converting a picture configuration which is in frame format to a configuration in field format, so that when a picture configuration is in frame format, smoothing is carried out only after the configuration has been converted to field format. "Picture configuration" refers to the configuration of a picture of a processing unit image, including, at least, frame format and field format. In this aspect, since frame formatted pictures are reorganized into fields, motion existing between fields, which must not be smoothed, will not be smoothed. As a result, a satisfactory image is obtained.

DESCRIPTION OF THE PREFERRED EMBODIMENTS

Embodiment 1

Figure 1:
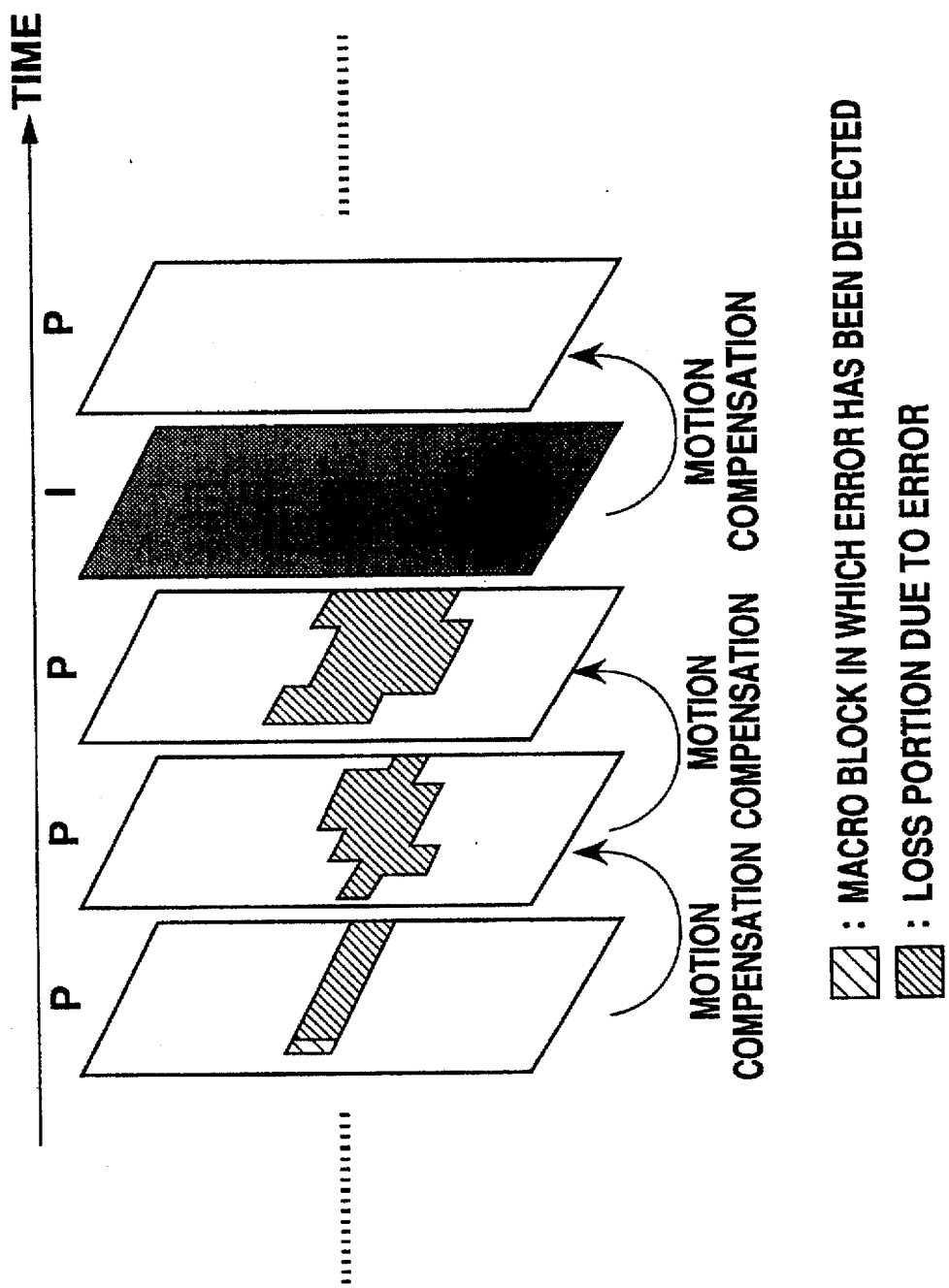
FIG. 1 is a figure showing coding as carried out using MPEG 1 or MPEG 2, and showing error propagation in the temporal direction generated during decoding.
Figure 2:
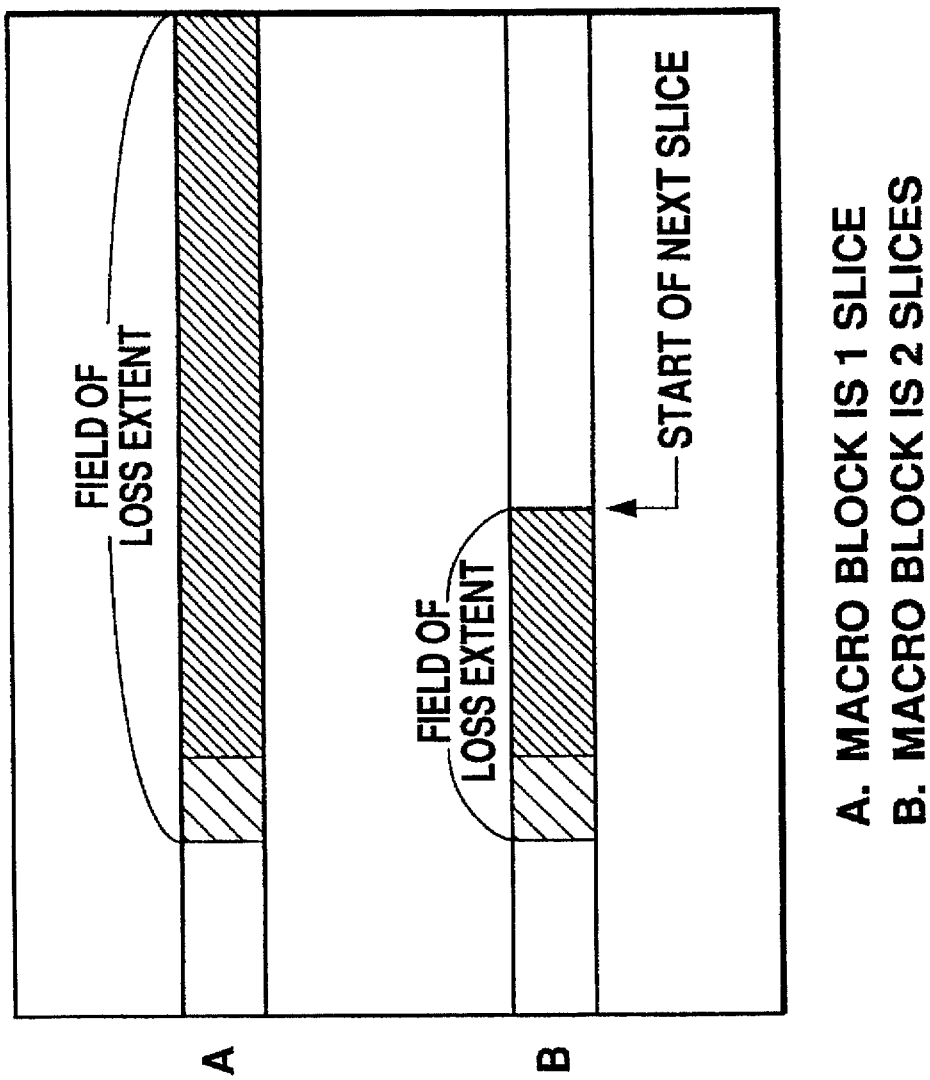
FIG. 2 is a figure showing a slice as defined by MPEG 1 or MPEG 2, and showing error propagation in the spatial direction generated during decoding.
Figure 3:
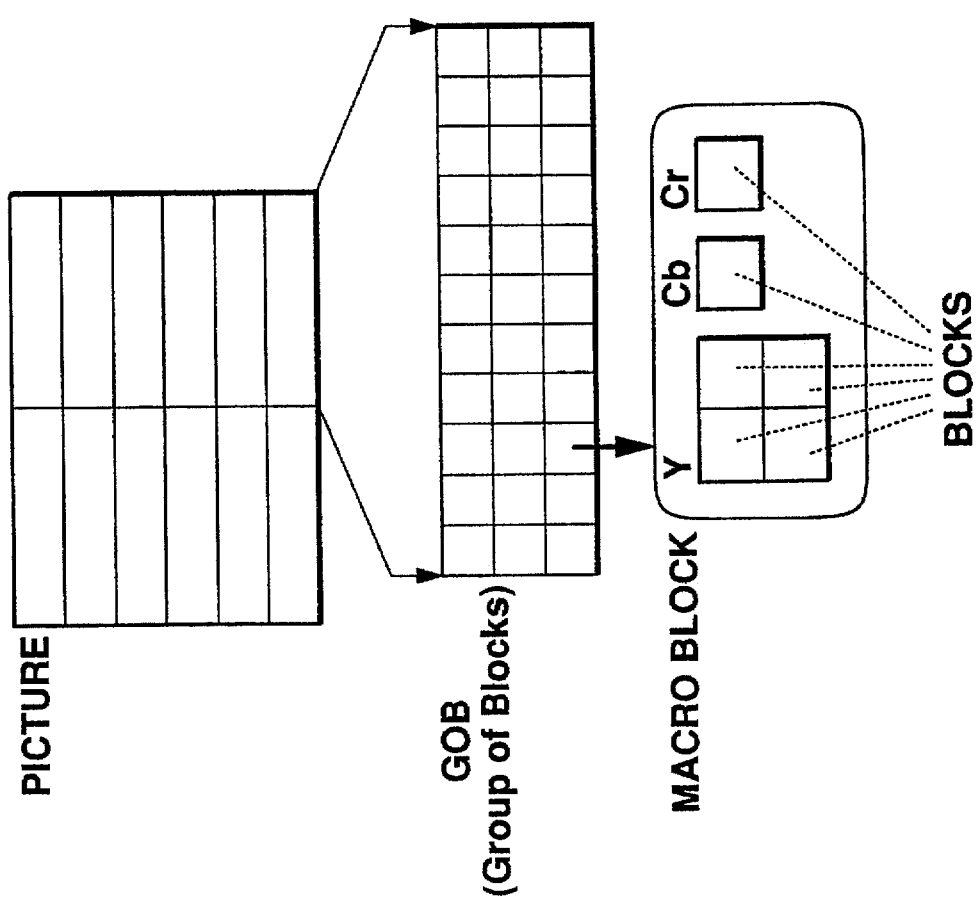
FIG. 3 is a figure depicting the data structure of an ITU-TH.261 video bit stream.

FIG. 3 is a figure depicting the data structure of an ITU-TH.261 video bit stream. A frame is positioned at a layer which is called the picture, and a GOB (Group of Blocks) layer is provided as a group of blocks. A macro block is comprised of Y blocks used for brightness, a Cb block used for blue color-difference and a Cr block used for red color-difference. The decoding apparatus in the present embodiment receives a coded bit stream in compliance with H.261, decodes it with macro block units and plays back the motion image data. Motion vector information obtained for each macro block by carrying out compensation prediction between pictures is used when decoding.

It is a characteristic of the processing of the present apparatus that when a picture is decoded, a macro block region which is a target of concealment processing is registered as a contaminated region, and thereafter if a predicted image of a macro block enters this contaminated region when other pictures are decoded, filtering processing is carried out for this prediction image.

[Configuration]

Figure 4:
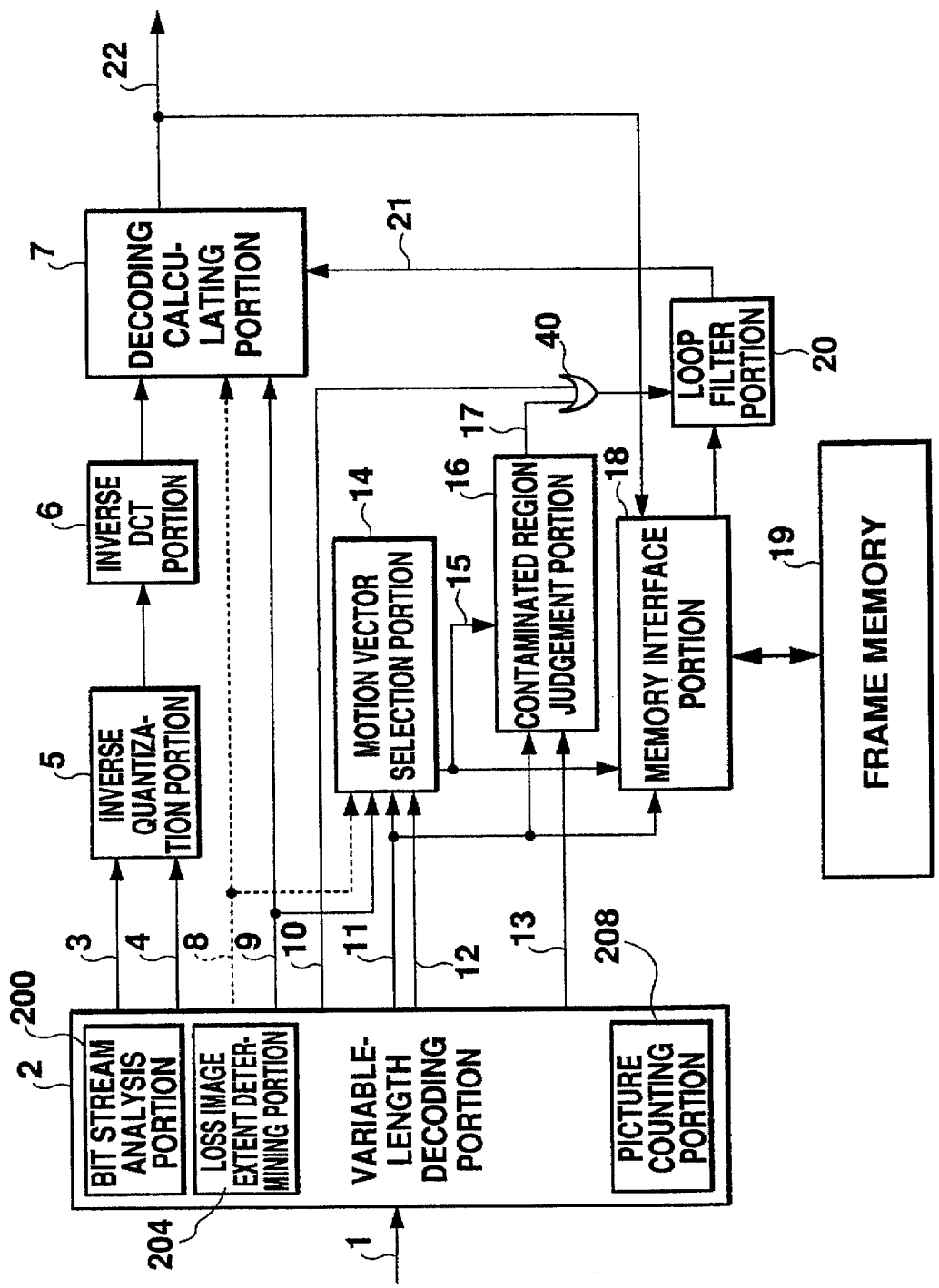
FIG. 4 is a figure depicting the configuration of the decoding apparatus in a first embodiment.

FIG. 4 is a figure depicting a configuration of the decoding apparatus in a first embodiment. This apparatus first receives a video bit stream 1. This bit stream is a coded data stream formed from image information and additional information. Image information is obtained by quantizing at each block a transformation coefficient obtained from the orthogonal transformation of the original image or the motion compensation prediction error image data of every macro block and then carrying out variable-length coding of a quantization index. Additional information is added at each picture and at each macro block. The present apparatus has a configuration which will follow this coding process in inverse.

This apparatus includes a variable-length decoding portion 2 for decoding a received video bit stream 1, a inverse quantization portion 5 for carrying out inverse quantization using a quantization DCT coefficient 3 and a quantization parameter 4 received from the variable-length decoding portion 2, a inverse DCT portion 6 for receiving the inverse quantumization result from inverse quantization portion 5 and carrying out an inverse DCT computation, a motion vector selection portion 14 for selecting and outputting a motion vector which will most accurately express the motion of a macro block (hereinafter referred to as a "final motion vector") based on screen position information 11 and a motion vector 12 of the relevant macro block, output from the variable-length decoding portion 2, a contaminated region judging portion 16 for judging if a predicted image is contaminated after referring to a final motion vector and an error flag 8 described below, a frame memory 19 for storing decoded image data, a memory interface portion 18 for controlling the writing and reading of frame memory 19, an OR gate 40 for notifying filter 20 when either of a loop filter operation instruction flag 10 or a contaminated region filtering instruction flag 17 described below has reached 2, a loop filter 20 which is a low pass filter in compliance with ITU-TH.261 for carrying out filtering of image data read from frame memory 19 when notification is received from OR gate 40, and a decoding addition portion 7 for calculating a predicted image from the output of loop filter 20 and the output of inverse DCT portion 6 and generating a final decoded image 22.

The variable-length decoding portion 2 of this embodiment has a bit stream analysis portion 200 for analyzing received bit stream 1, a loss image extent determining portion 204 for determining an image region which has been lost due to error when an error has been detected by the result of analysis, and a picture counting portion 208 for counting the number of decoded pictures in order to determine the contaminated region tracking period, described below. The picture counting portion 208 may also count the number of pictures after an error has been detected. In either case, picture counting portion 208 issues a contaminated region storage memory reset instruction 13, described below, to the contaminated region judging portion 16 once the count number has reached a designated value.

[Operation]

Figure 5:
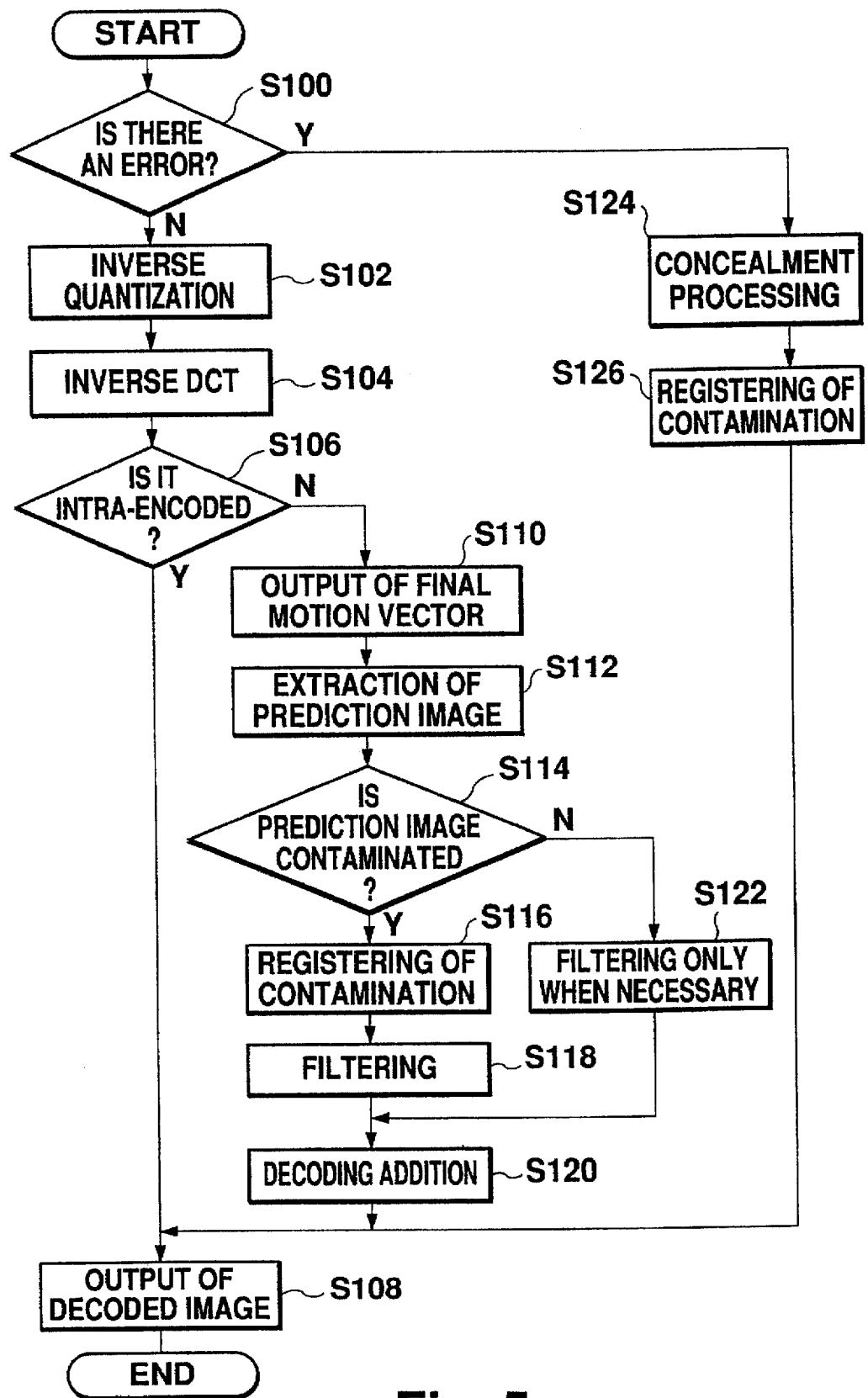
FIG. 5 is a flowchart showing a decoding procedure according to the apparatus of the first embodiment.

FIG. 5 is a flowchart showing a decoding procedure according to an apparatus of the first embodiment. Bit stream analysis portion 200 analyses data stream 1 based on the H.261 syntax and a judgment is made concerning the existence of an error (S100). Here, an error is detected which does not conform to the specified code language. According to the decision at S100, the process branches depending on whether or not an error is found. If no error is detected at decision S106 the process branches depending on whether the image being processed has been intra-coded or inter-coded. Intra-coding refers to coding which is carried out without including motion vector information, and inter-coding refers to coding in which motion vector information is included in the attribute information at the time of coding.

[1] Normal Decoding Operation

If no error is detected at S100, the decoding process commences as usual. In the case where the target of the processing is a macro block which has been intra-coded (hereinafter referred to as an "intra-coded macro block"), that is to say in a case where the intra/inter flag 9 is indicating intra, processing passes from the length-variable decoding portion 2 to the inverse quantization portion 5, and then the inverse DCT portion 6. Since intra-coded macro blocks do not include motion vector information in principle a configuration for motion vectors is not used. The output of the inverse DCT portion 6 presents an original signal within a frame and this passes through the decoding addition portion 7 to become the final decoded image 22. In FIG. 5 this processing is shown as a path in which inverse quantization (S102) and inverse DCT (S104) are carried out and a decoded image is output (S108) following a judgment as to whether or not it is intra-coded (S106).

In the case where the target of the processing is a macro block which has been inter-coded, that is, where the intra/inter flag 9 indicates inter, the signal is processed by both the path described above and a path passing through a motion vector selection portion 14, and the processing results of these are calculated by a decoding calculating portion 7.

The former process is carried out by the inverse quantization (S102) and inverse DCT (S104) shown in FIG. 5. In this case, the output signal of the inverse DCT portion 6, is also a signal for predicting error between motion compensation prediction frames. The latter process corresponds to S110–122 in FIG. 5. Since the processing target in S106 is an inter-coded macro block, the processing proceeds to S110. A final motion vector 15 is then output from the motion vector selection portion 14. If there is no error, the motion vector of the relevant macro block can simply be used as the final motion vector. Thereafter the on-screen position information 11 and the final motion vector 15 are sent to the memory interface portion 18, the address of the predicted image is produced and the predicted image is extracted from the frame memory 19 (S112). The predicted image is then sent to the loop filter portion 20.

The existence of contamination in the predicted image is judged in parallel with the above process (S114). A detailed description of the judging method is given below. If it is determined that the image is contaminated (Y in S114), the on-screen position information for that predicted image is registered in a decoded picture contaminated region memory 36 described below (S116). This is so that this information can be referred to when subsequent pictures are decoded. Next the contaminated region filtering instruction flag 17 is set to 1. As a result, filtering is performed at the loop filter portion 20 (S118) and a final state 21 of the predicted image(hereinafter referred to as "final predicted image 21") is obtained. Furthermore, since judgment of the existence of contamination at S114 is possible by referring to the decoded picture contaminated region memory 36, extraction of the predicted image(S112) does not have to be carried out before S114, and these processes can be performed in parallel.

The final predicted image 21 is sent to the decoding addition portion 7, added to the output of the inverse DCT portion 6 and a decoded image 22 is output (S120). Since the decoded image 22 will be used as a predicted image for subsequent pictures, it is written in the frame memory 19 based on the on-screen position information 11 of the relevant macro block.

If a predicted image is judged not to be contaminated in S114 (N in S114) filtering is performed only in the case in which the loop filter operation instruction flag 10 is at 1 (S122). In the H.261 specification, the loop filter operation instruction flag 10 is a bit flag to be set for each with macro block unit in the original bit stream 1 and the value of the flag depends on the coding side.

[2] Decoding Operation when Error is Detected (1) Concealment Processing

When an error is detected at S100, concealment processing is first carried out (S124). Errors can occur irrespective of whether a macro block is intra-coded or inter-coded. Concealment processing refers to the process in which a motion vector is estimated for a macro block which has been lost due to error and a substituted image is extracted from a picture which has already been decoded and is being stored in the frame memory 19 (since such a picture will be used for prediction, it is hereinafter referred to as a "prediction picture"). Since this predicted picture will be used as a predicted for the relevant macro block when an error is detected, the output of the inverse DCT portion 6 is ignored.

Figure 6:
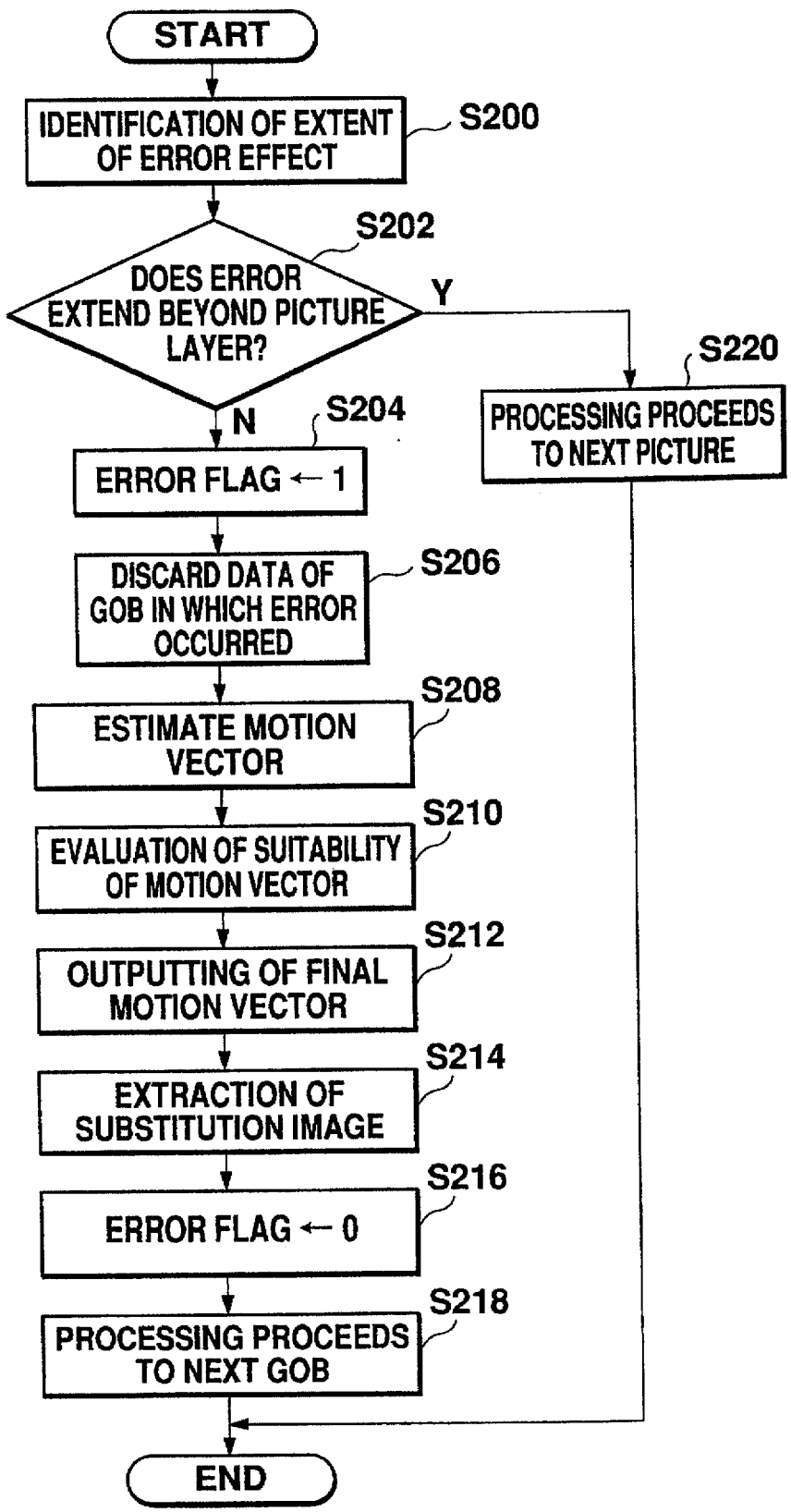
FIG. 6 is a flowchart showing a concealment processing procedure.

FIG. 6 is a flowchart showing procedures for concealment processing. As the flowchart shows, a loss image extent determining portion 204 first identifies the extent of image data which has suffered adverse effects due to the error (S200). For instance, in the case where an error has been generated in a picture layer and continuity of decoding is not possible (Y in S202), all data relating to that picture is discarded (S220) and concealment processing is discontinued. In such a case, since one picture disappears, another process is carried out, such as one which displays the same picture twice.

Alternatively, for N at S202, because it is assumed that an error has been generated for which continuity of decoding is not possible at a level below the GOB layer, an error flag 8 is first set to 1 (S204) and the data relating to the GOB in which the error occurred is discarded (S206). By this process, data for a number of macro blocks are lost. A motion vector is estimated for these macro blocks (hereinafter referred to as "lost macro blocks") (S208). Next, following an evaluation of the adequacy of the estimated motion vector (S210), a final motion vector is output (S212).

Figure 7:
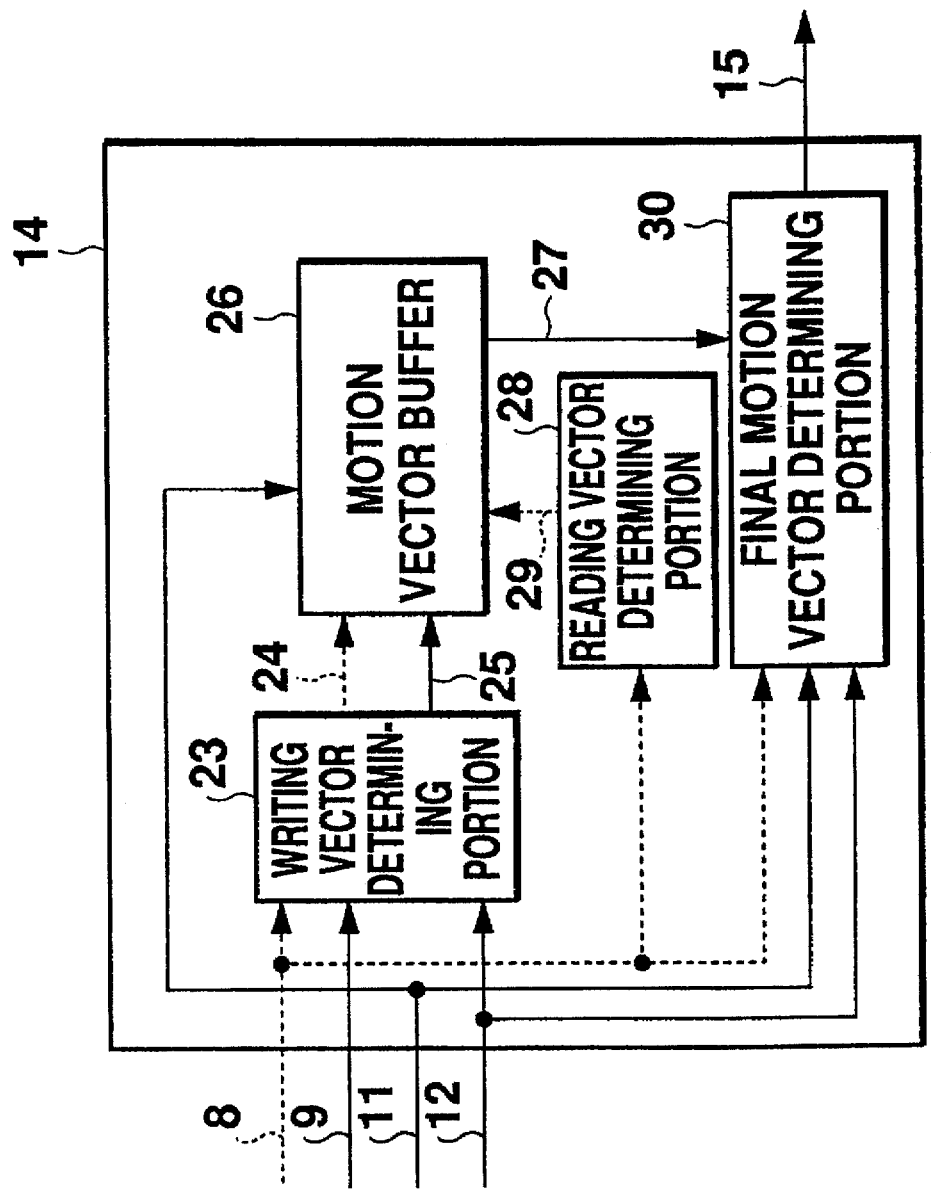
FIG. 7 is a diagram showing the internal configuration of the motion vector selection portion 14 of the first embodiment.

Processing from the estimation of a motion vector to the output of a final motion vector is carried out in the motion vector selection portion 14. FIG. 7 is an internal configuration figure of the motion vector selection portion 14 of the first embodiment. The motion vector selection portion 14 has a motion vector buffer 26 which stories a motion vector for each macro block in a plurality of macro block lines, a writing vector determining portion 23 which refers to error flag 8 and intra/inter flag 9 and supplies a writing instruction 24 and a writing vector value 25 to the motion vector buffer 26 to control writing, a reading vector determining portion 28 which supplies a reading instruction 29 to the motion vector buffer 26 and controls reading of the vector value, and a final motion vector determining portion 30, into which the estimated motion vector 27 is input from the motion vector buffer 26 in order to judge the adequacy of that vector, which and outputs a final motion vector 15. The final motion vector determining portion 30 also makes reference to error flag 8 and the on-screen position information 11 for the relevant macro block.

In the present embodiment the motion vector for a macro block immediately above the lost macro block is estimated as the motion vector of the lost macro block. This is based on the experience that motion vectors between proximate macro blocks are highly similar. In this process, it is sufficient for the motion vector buffer 26 to maintain a motion vector which relates to a macro block included in a macro block line which is one line above the macro block line in which the lost macro block exists.

In this configuration, while the error flag 8 is at 0, the writing vector determining portion 23 writes 0, for an intra-coded macro block, or a decoded motion vector value, for an inter-coded macro block, as the writing vector values in the motion vector buffer 26. Alternatively, while the error flag 8 is at 1, since no accurate motion vector exists for the relevant macro block itself, 0 is written as the vector value 25. This is a precaution taken so that the macro block directly below does not suffer any adverse effect from the motion vector of the current lost macro block in the subsequent processing.

When the error flag 8 is at 1, based on the on-screen position information 11 of the lost macro block, the reading vector determining portion 28 reads the motion vector of a macro block immediately above the current lost macro block as an estimated motion vector 27. When the error flag 8 is at 0, since the motion vector of the relevant macro block is accurately decoded, it is read as is.

When the error flag 8 is at 1, the adequacy of the estimated motion vector 27 is evaluated at the final motion vector determining portion 30 (S210). In the present embodiment, when the estimated motion vector 27 is used as the motion vector for the relevant macro block, if the vector points outside of the screen, this is judged to be inadequate. In such a case the vector value is set to 0 and output as a final motion vector 15. If the estimated motion vector 27 is adequate, it is output as a final motion vector 15 (S212). The final motion vector 15 is transferred to the memory interface portion 18 and the substituted image obtained (S214) is taken as the prediction image. Thereafter the error flag 8 is returned to 0 (S216), and the process proceeds to the next GOB (S214) and the concealment processing ends.

When the concealment processing has ended, the macro block which has been the object of the concealment processing is registered in the decoded picture contaminated region memory 36 as a contaminated region (S126). In due course, the predicted image obtained is output as a decoded image 22 (S108). In the present embodiment, when the error flag 8 is at 1, the output of the inverse DCT portion 6 is ignored at the decoding addition portion 7 irrespective of whether it is for an intra-coded macro block or an inter-coded macro block. As a result the predicted image determined from the estimated motion vector 27 becomes the decoded image. In addition, since addition of prediction error signals between compensation prediction frames is not carried out when a lost macro block is decoded, the filtering described below is not carried out.

(2) Judging and Filtering of Contaminated Regions

The processes of judging of contaminated regions at S114, registering of contaminated regions at S116 and S126, and filtering at S118 will now be explained.

(2-1) Outline

Figure 8:
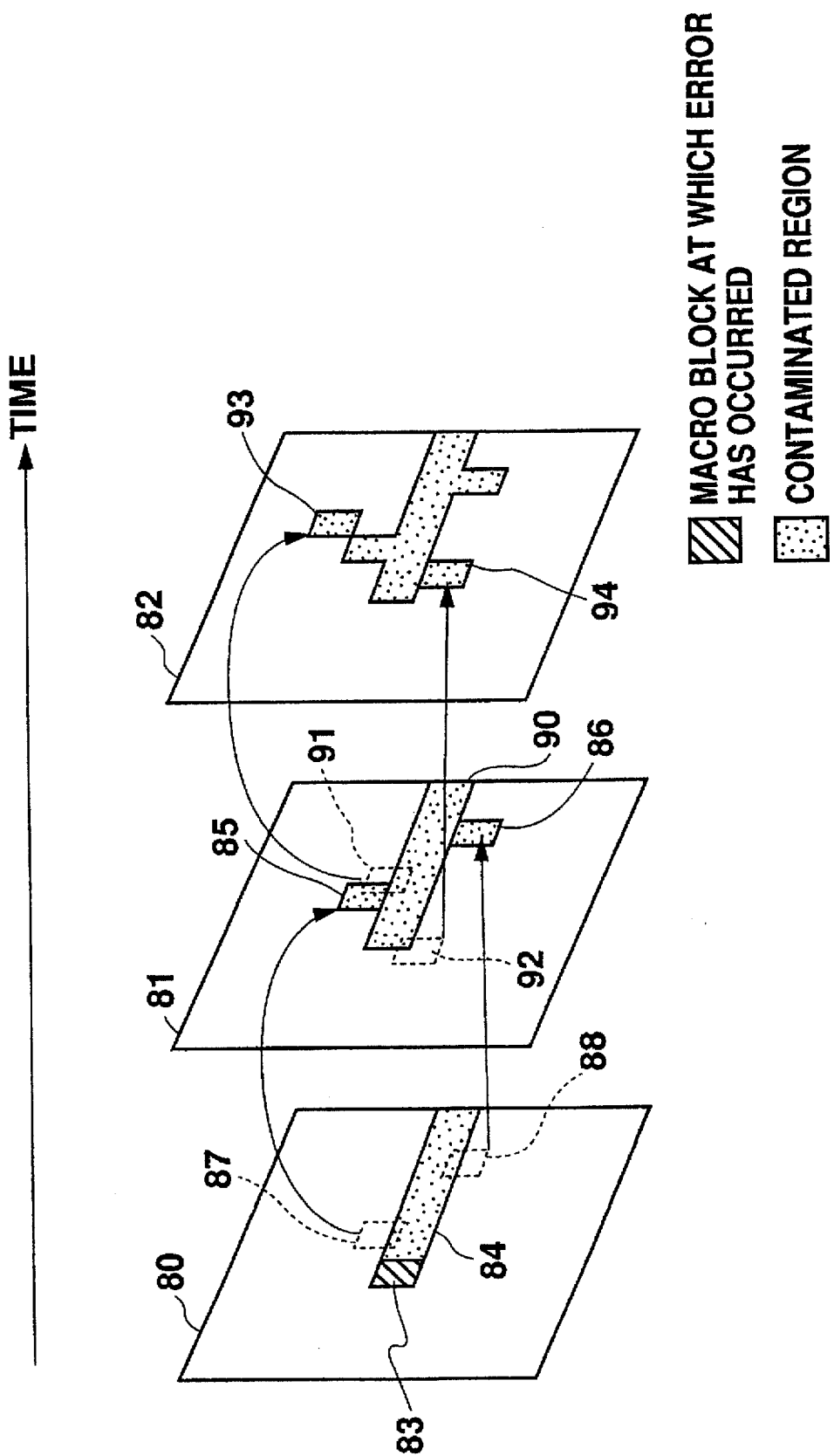
FIG. 8 is a figure depicting an outline of the registering, judging and filtering processing for a contaminated region.

FIG. 8 is a figure depicting an outline of these processes. First, in a picture 80, in which an error has been detected, a group of macro blocks including the macro block 83 in which an error has been detected, and for which concealment processing has been carried out, is registered as a contaminated region 84. In the next picture 81, even in places where no error has been detected in bit stream 1, as with macro blocks 85 and 86 in this figure, motion compensation prediction can be carried out from prediction images 87 and 88, which have at least one portion included in the contaminated region 84. Since the desired ideal predicted image for these macro blocks 85 and 86 is not obtained, the image quality of the decoded image deteriorates. Similarly, since motion compensation prediction is carried out based on the prediction images 91 and 92 which are included in the contaminated region 90 of picture 81, the contamination spreads to macro blocks 93 and 94 of the picture 82. Since motion compensation prediction is here carried out in macro block units, the image which is output has distinctive macro block borders. Filtering is therefore applied to prediction images included in the contaminated region, the decoded image is smoothed to a certain extent and the distinctivity of the macro block borders is decreased. As a result, adverse effects of contamination can also be reduced in a case where a region to which filtering processing has been applied is to be a predicted image for subsequent pictures.

The judging of contaminated regions, registering of contaminated regions and filtering process are carried out at the necessary places (3, 5~7 below) during the following sequence:

1. an error is detected when a certain picture is decoded
2. concealment is carried out for the lost macro block
3. the region of said lost macro block is registered as a contaminated region
4. when decoding another picture, a predicted image of a certain macro block is used
5. it is determined that a predicted image is included in the contaminated region
6. the region of that predicted image is re-registered as a contaminated region
7. filtering processing is applied to that predicted image
8. a decoded image is output based on the filtered predicted image S126 in FIG. 5 corresponds to 3 above and is characterized in that it is carried out without a contamination judgment. However, S116 corresponds to 6. above and is carried out with reference to the contamination judgment result.

(2-2) Judgment and Registration of a Contaminated Region

Figure 9:
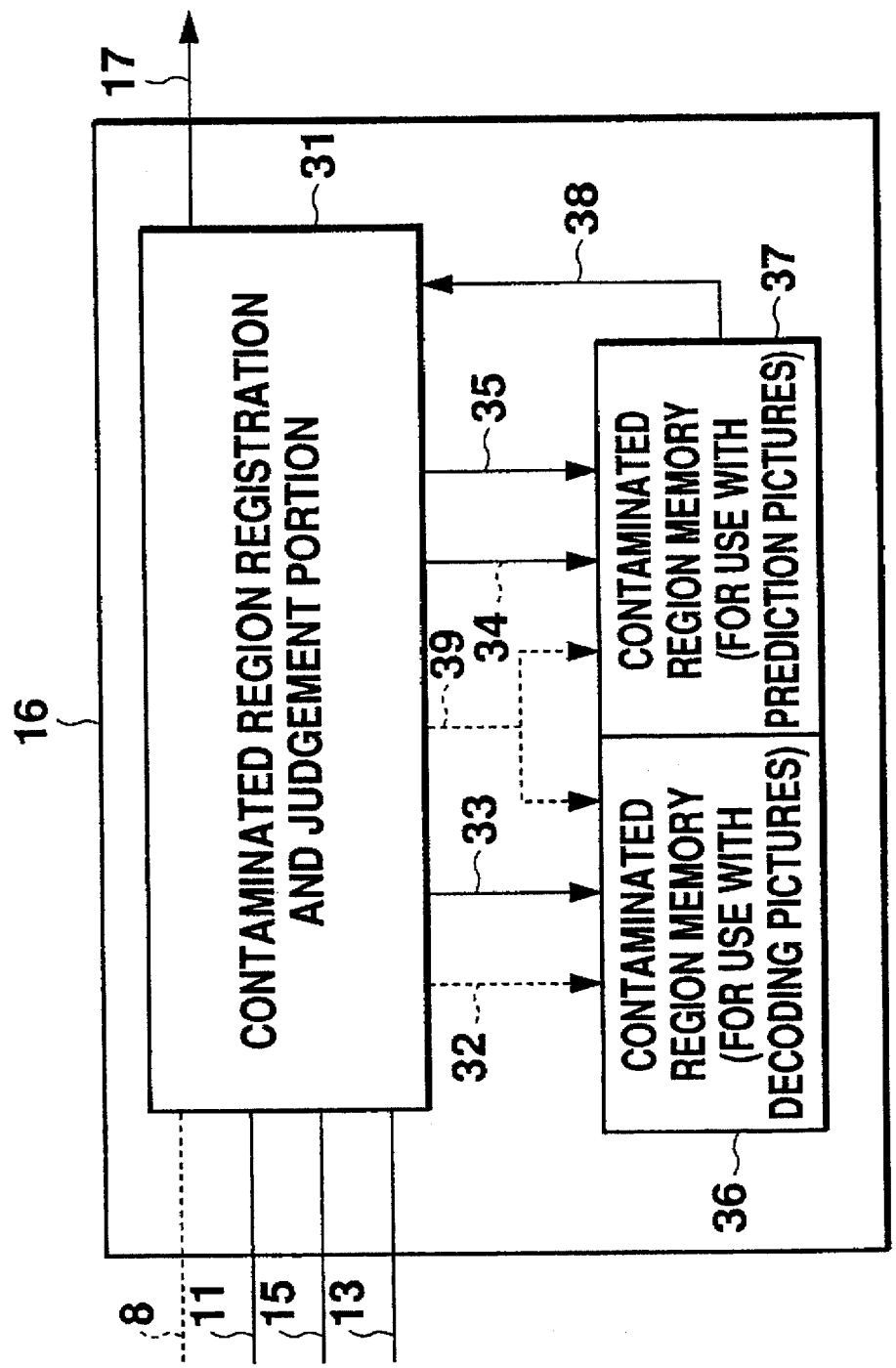
FIG. 9 is a figure showing the internal configuration figure of the contaminated region judging portion 16 of the first embodiment.

Judgment of a contaminated region is carried out at a contaminated region judging portion 16. FIG. 9 is an internal configuration figure of a contaminated region judging portion 16 of the first embodiment.

The contaminated region judging portion 16 uses the error flag 8, the on-screen position information 11 of the macro block, the final motion vector 15, and a contaminated region memory reset instruction 13 (to be described below), and includes a contaminated region registering and judging portion 31, for controlling reference to registration of the contaminated region, and outputting a contaminated region filtering instruction flag 17. The contaminated region judging portion 16 also includes a contaminated region memory 37 for use with decoded pictures and a contaminated region memory for use with prediction pictures 37. The former registers a contaminated region included in a picture which is presently being decoded and the latter is referred to check whether or not a predicted image is included in a contaminated region. When the decoding of one picture is completed, the contaminated region memory for use with decoded pictures 36 is switched to the contaminated region memory for use with prediction pictures 37 so that any registered contaminated regions can be referred to when decoding the next picture. Since the contaminated region memory for use with decoded pictures 36 is now empty, it is used as the contaminated region memory for use with prediction pictures 37. Thereafter each time the decoding of one picture is completed the contaminated region memory for use with decoding pictures 36 and the contaminated region memory for use with prediction pictures 37 are switched. The former memory is used only for registering, the latter memory is used only for reference.

The contaminated region registering and judging portion 31 controls the contaminated region memory for use with decoding pictures 36 with a writing instruction 32 and an address 33 (included in the on-screen position information 11 of the macro block presently being processed), and similarly controls the contaminated region memory for use with prediction pictures 37 with a reading instruction 34 and an address 35 which is the target of the reading.

The operation of the above configuration will now be explained.

When the error flag 8 is at 1, the contaminated region registering and judging portion 31 regards the macro block presently being processed as contaminated and registers the on-screen position information 11 of that macro block with the contaminated region memory for use with decoding pictures 36. This corresponds to S126 in FIG. 5.

Figure 10:
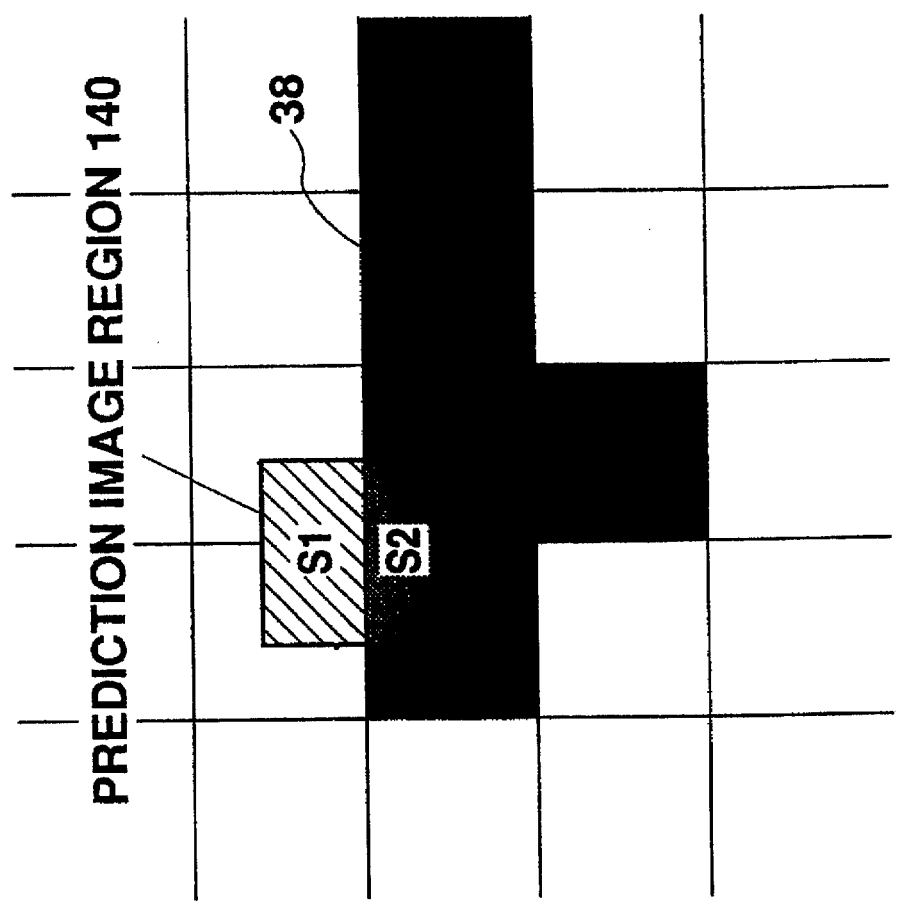
FIG. 10 is a figure depicting the state of processing of contaminated region registering and judging portion 31.

Alternatively, if the error flag 8 is at 0, contamination judgment is first carried out. FIG. 10 is a figure depicting the state of processing in the contaminated region registering and judging portion 31. In this figure a predicted image region 140 is first determined from the final motion vector 15 and the on-screen position information 11 of the relevant macro block. Next a macro block address within the predicted picture and having a region overlapping the predicted image region 140 is obtained. Based on this address the distribution of the contaminated region 38 shown in the figure is obtained from the contaminated region memory for use with prediction pictures 37. An contamination is made based on the degree of overlap between this contaminated region 38 and the predicted image region 140 using the following equation:

$$P1 > TH \quad \text{(Equation 1)}$$

P1 is the share of the contaminated region included in the prediction image. For example, if the area of the portion of the predicted image region not overlapping with the contaminated region is S1 and the area of the overlapping portion is S2, then a calculation is carried out with:

$$P1 = S2/(S1+S2)$$

TH is the threshold value for determining a contaminated region. In the present embodiment a predicted image is judged to be contaminated if it satisfies this equation. TH in this equation is set independent of the properties and content of the motion image and the decoding conditions—a fixed value may be used or the value can be varied in response to conditions. According to the setting of this value, the distribution aspect of the contaminated region can be controlled and image control is possible in response to decoding conditions.

If the result of the judgment is that a predicted image of a macro block being decoded is included in a contaminated region, the on-screen position information 11 of the relevant macro block is registered as a contaminated region with the contaminated region memory for use with decoding pictures 36 and the contaminated region filtering instruction flag 17 is set to 1.

Here the question has been that of whether or not a contaminated region exists in a prediction picture, but in a case in which an error is detected in, for instance, a picture being decoded, the error flag 8 is set to 1, the concealment processing described above is carried out until immediately before the next GOB and the macro blocks which have been the targets of the processing are all registered as contaminated regions.

(2-3) Filtering Process

Figure 11:
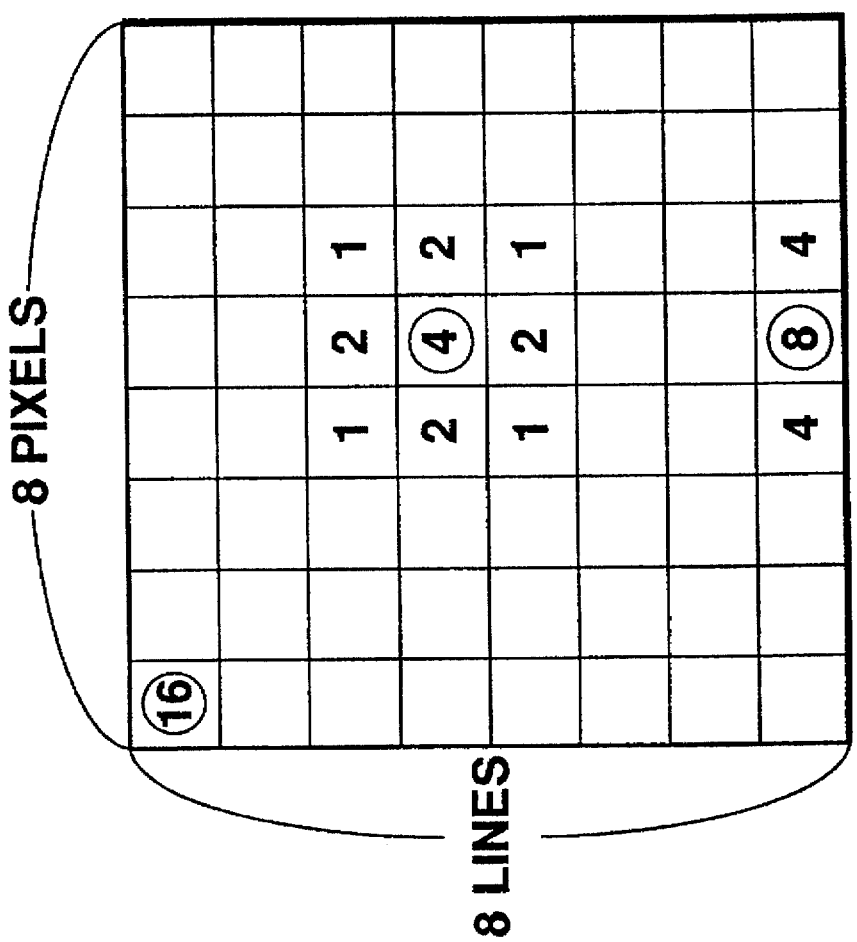
FIG. 11 is a figure showing the coefficients of a filter used in the loop filter portion 20.

When the contaminated region filtering instruction flag 17 is at 1, a loop filter portion 20 is operated and a low-pass filter is applied to the prediction image. FIG. 11 is a figure showing the coefficients for a possible filter to be used in the loop filter portion 20. The numbers in the figure indicate the filter coefficients for a pixel at 0. In the present embodiment a filter in compliance with H.261 is used as this filter. Filtering is applied to all blocks formed from 8×8 pixels which define brightness and color differences.

(2-4) Limitation of Filtering Process

Filtering over a long time period leads to deterioration of the resolution. In the present embodiment see FIG. 4, a picture counting portion 208 counts the number of pictures decoded after error detection and issues a contaminated region memory reset instruction 13 to the contaminated region judging portion 16 when the count value has reached a designated value.

The contaminated region registering and judging portion 31 complies with the contaminated region memory reset instruction 13 and according to a reset instruction 39 carries out initialization of the contents of the contaminated region memories for use with prediction pictures and decoding pictures 36 and 37, which erases all previous registrations. As a result, contaminated region tracking is halted, contaminated region registration and filtering is not carried out until the next error is detected, and excessive smoothing due to filtering is prevented (the interval between resets of the contaminated region memory is hereinafter referred to as a "contaminated region tracking period"). The determining method of the contaminated region tracking period is settable, and either fixed or variable values may be used. According to this setting, the distribution aspect of the contaminated region can be controlled and image control is possible in response to decoding conditions.

Embodiment 2

[Configuration]

Figure 12:
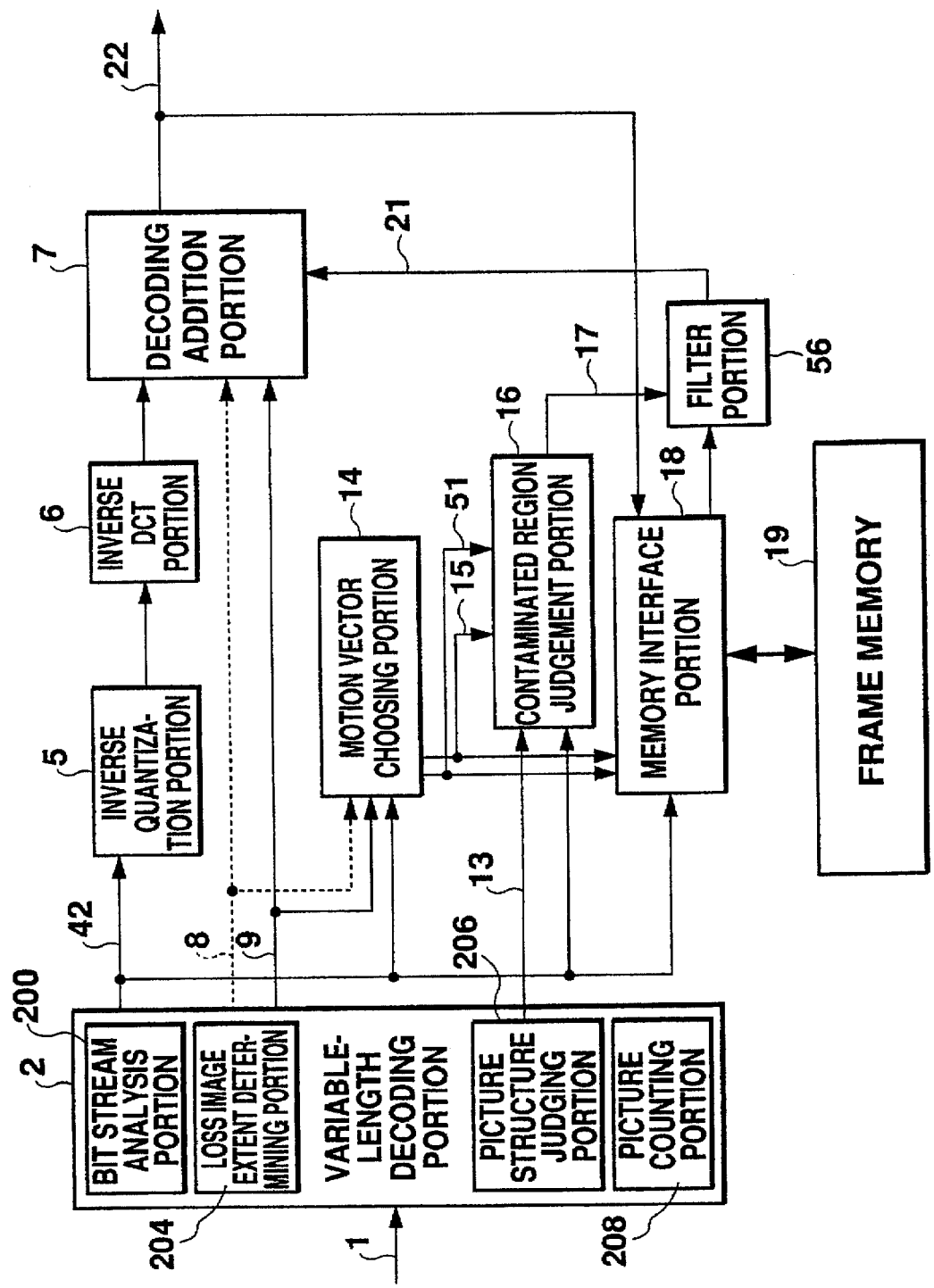
FIG. 12 is a configuration figure of the decoding apparatus in a second embodiment.

FIG. 12 is a configuration figure of a decoding apparatus in a second embodiment. In this embodiment a bit stream which has been coded in compliance with MPEG 1 video (ISO/IEC 11130-2) is received and decoded and motion image data are played back.

Figure 13:
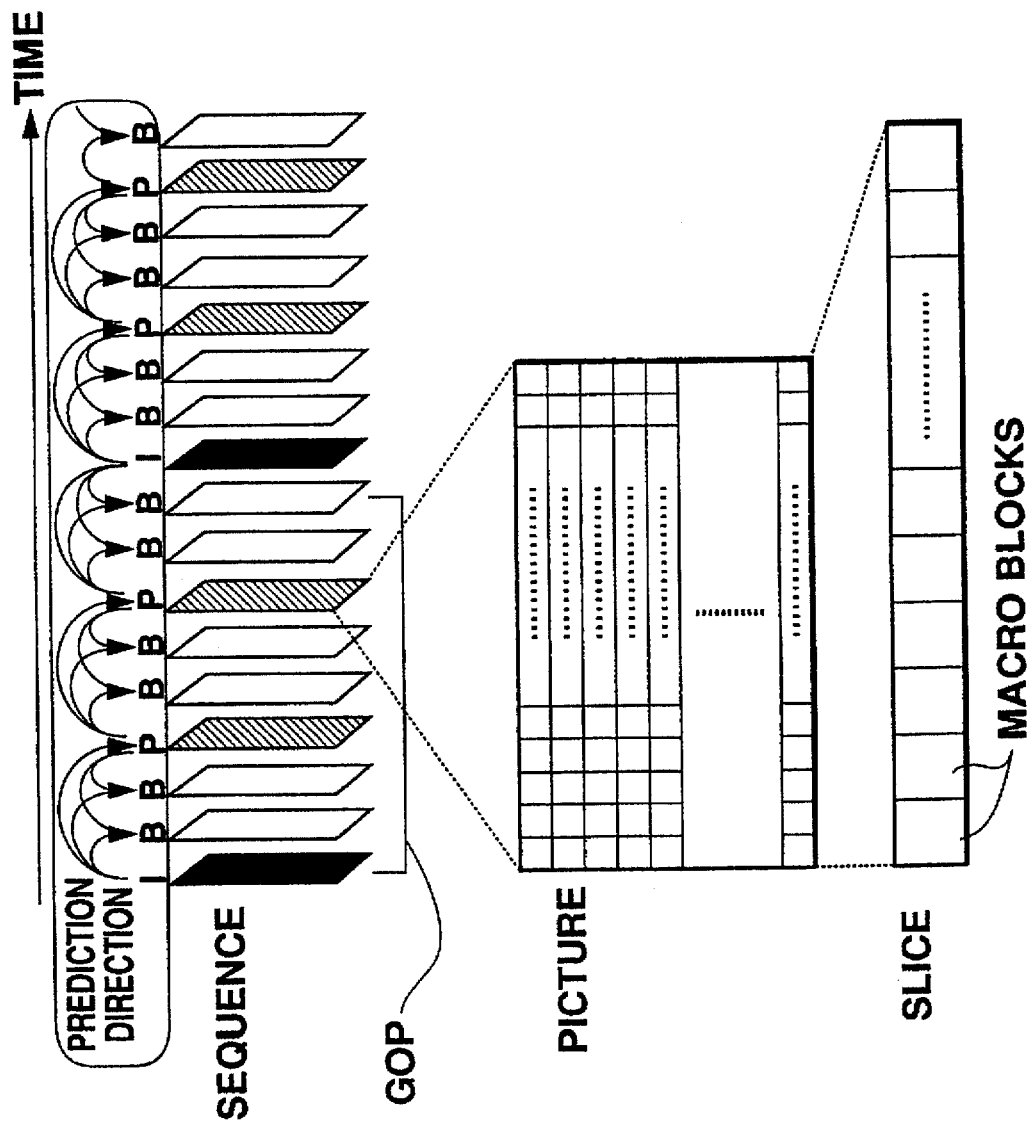
FIG. 13 is a figure depicting the data configuration of a video bit stream in compliance with the MPEG 1 video standard.

FIG. 13 is a figure depicting the data configuration of a video bit stream which complies with MPEG 1 video. Frames are positioned in layers referred to as pictures and, based on the permitted prediction direction, these picture are divided as: I pictures, P pictures and B pictures. A picture is a collection of slices and each slice is a collection of macro blocks. A macro block is formed from 4 brightness blocks Y1–4 and color blocks Cb and Cr. The arrows in the "Prediction Direction" section indicate the prediction direction. The arrows pointing to the right indicate forward prediction and those pointing to the left indicate rearward prediction. For I pictures, motion compensation prediction is not carried out and closed coding (intra-coding) is carried out within the picture. For P pictures, only motion compensation prediction from temporally previous pictures (forward prediction) is permitted. For B pictures, motion compensation prediction from temporally later pictures (rearward prediction) is also permitted. In addition, prediction which combines prediction from temporally previous pictures with prediction from temporally later pictures is also possible and is termed interpolated prediction (bi-directional prediction). A slice layer is formed from a collection of macro blocks. A slice is the minimum decoding synchronous unit.

The same codes are used for elements in FIG. 12 which correspond to those in FIG. 4 and only those portions which differ from the first embodiment will be explained.

FIG. 12 differs from FIG. 4 in that: the receiving video bit stream 1 is MPEG 1 video-compliant; a picture configuration judging portion 206, which judges the picture configuration, is added in the variable-length decoding portion 2 (however, the picture configuration judging portion 206 is not itself required for MPEG 1 as will be explained in relation to MPEG 2 in a third embodiment); quantization parameter 3, quantization DCT coefficient 4, on-screen position information 11 and motion vector 12 are sent via a parameter bus 42 to the inverse quantization portion 5; a loop filter 20 is not required and instead a filter portion 56 is used, which operates in compliance with a contaminated region filtering instruction 17; loop filtering operation instruction 10 and OR gate 40 have been deleted along with the deletion of loop filter 20; and the prediction direction 51 used in decoding is supplied to the contaminated region judging portion 16. Filter portion 56 executes the filtering process in compliance with the coefficients shown in FIG. 11.

[Operation]

Those operations which differ from those for the first embodiment will now be explained.

[1] Normal Decoding Operation

S100~122 in FIG. 5 are carried out. When the decoding target is an intra-coded macro block, the inverse quantization portion 5 extracts a quantization parameter and a quantization DCT coefficient from the parameter bus 42. Thereafter, the process is the same as in the first embodiment.

When the decoding target is an inter-coded macro block, the motion vector selection portion 14 latches the motion vector and the prediction direction information sent through the parameter bus 42 and outputs them as they are as the final motion vector 15 and the final prediction direction information 51 respectively. A t the memory interface portion 18 the type of the picture to which the relevant macro block belongs and the on-screen position information of the relevant macro block are latched from the parameter bus 42. A prediction picture is then determined by referring to the picture type and a picture address is created based on the on-screen position information, final motion vector 15 and final prediction direction information 51 of the relevant macro block, and a predicted image is extracted from the frame memory 19. The predicted image is not put through the filter but is sent as is as the final predicted image 21 to decoding addition portion 7 where it is added to the output of inverse DCT computation portion 6 to become final predicted image 22. Since the decoded image of an I picture or B picture will be used as a prediction picture for subsequent pictures, it is written once again in the frame memory 19 based on the on-screen position information of the relevant macro block latched at the memory interface portion 18.

[2] Decoding Operation when Error is Detected (1) Concealment Processing

The processing shown in FIG. 6 is carried out. However, in the present embodiment, because GOBs are not used in MPEG, GOB should be interpreted as slices. The present embodiment is characterized in that extraction of a prediction image is carried out taking into consideration not only the motion vector but also the prediction direction. In this embodiment the following prediction pictures and motion vectors are used in concealment processing for each of the types of picture.

1. I Pictures

Motion compensation prediction is not normally carried out for I pictures but the concept of a prediction picture is introduced. The most recently decoded I or P picture is taken as the prediction picture and the estimated motion vector is put at zero. In other words, a macro block at the same on-screen position as the macro block now being processed is taken unchanged from the most recently decoded I or P picture as the prediction image. Therefore it may be said that I picture concealment is carried out according to forward prediction. This prediction direction is treated as an estimated prediction direction, described below.

2. P Pictures

As in the first embodiment the motion vector of the macro block immediately above the lost macro block is taken as the estimated motion vector. The prediction picture of the macro block immediately above is also taken unchanged as the prediction picture. Therefore the prediction direction for P pictures is also forward.

3. B Pictures

The movement vector follows the macro block immediately above as with P pictures. Therefore, in B picture concealment, the estimated prediction direction is either forward or rearward depending on the prediction direction of the macro block immediately above the lost macro block.

Figure 14:
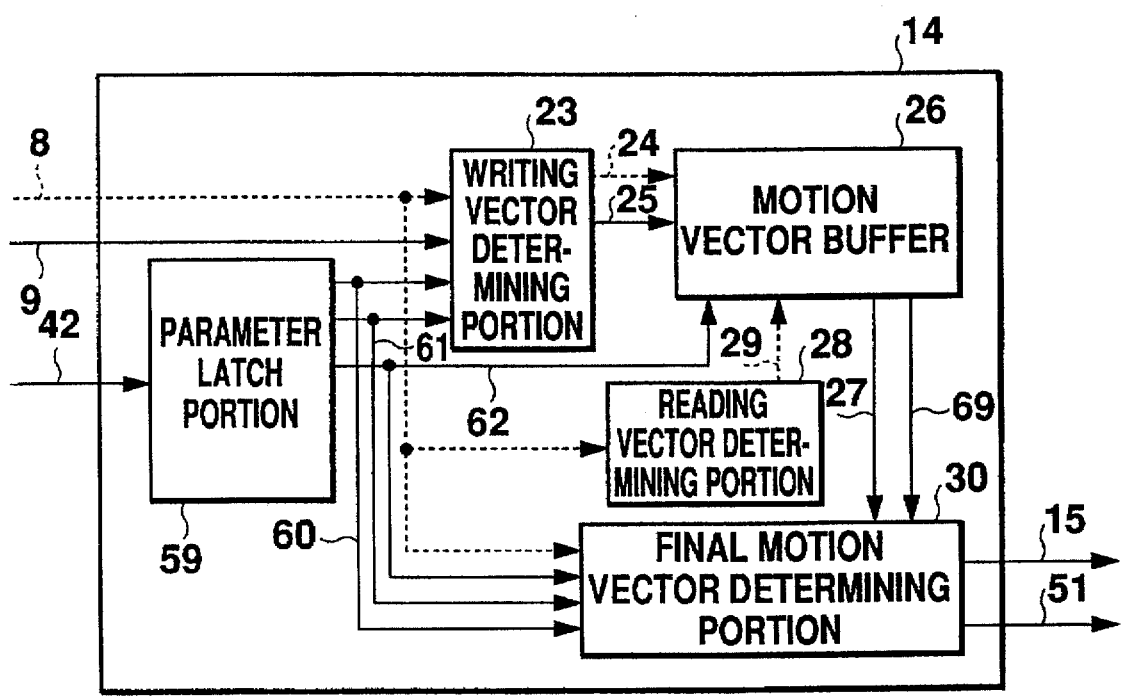
FIG. 14 is an internal configuration figure of a motion vector selection portion 14 in the second embodiment.

The process wherein a final motion vector 15 is created from an estimated motion vector thus determined is carried out by the motion vector selection portion 14. FIG. 14 is an internal configuration figure of the motion vector selection portion 14 in the second embodiment. The main difference between this figure and the configuration shown in FIG. 7 is that a parameter latch portion 59 is provided for latching a signal group on the parameter bus 42. The parameter latch portion 59 latches the motion vector, prediction direction and on-screen position information of a macro block being decoded. The latched motion vector 60, prediction direction 61 and on-screen position information 62 are supplied to a writing vector determining portion 23 and a final motion vector determining portion 30. A further difference is that in addition to the estimated motion vector 27, the estimated prediction direction 69 described above is also sent from motion vector buffer 26 to final motion vector determining portion 30.

When the error flag 8 is at 1, the motion vector and prediction direction of the macro block immediately above that macro block are extracted respectively from the motion vector buffer 26 as the estimated motion vector 27 and the estimated prediction direction 69 based on the on-screen position information of the macro block being decoded. These are output through the final motion vector determining portion 30 as the final motion vector 15 and the final prediction direction 51. The final motion vector determining portion 30 evaluates the adequacy of the estimated motion vector 27 based on the estimated motion vector 27 and the estimated prediction direction 69. When the result of the evaluation is that the estimated motion vector 27 is inadequate, 0 is output as the value of the final motion vector 15 and forward is output as the final prediction direction 51. These results are transferred to the memory interface portion 18 and thereafter, using a process identical to that in the first embodiment, a predicted image is obtained.

(2) Judging and Filtering of Contamination Regions

Figure 15:
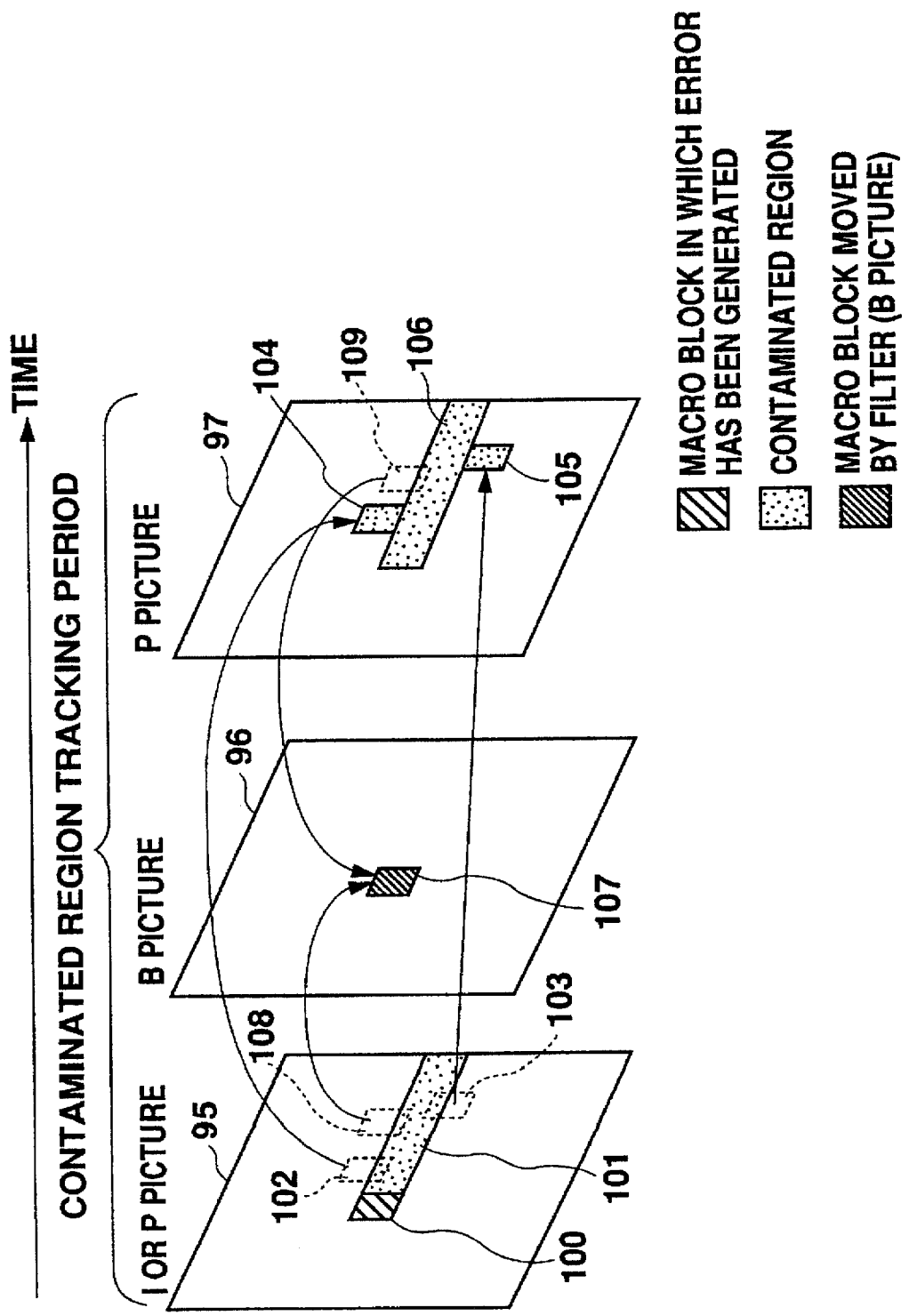
FIG. 15 is a figure explaining the entire processing of registering, judging and filtering processing for a contaminated region according to the second embodiment.

FIG. 15 is a figure for explaining the registering, judging and filtering processing of a contaminated region according to the second embodiment. It depicts the state of a B picture which is decoded according to interpolation prediction. Here, an error has been detected at a macro block 100 in the first picture 95 and the slice which includes that block has been registered as a contaminated region 101. Macro blocks 104 and 105 in the following P picture 97 have been decoded from the prediction images 102 and 103 included in the contaminated region 101 with the result that the contaminated region 106 in the P picture 97 has expanded. The macro block 107 which is actually being decoded now in the B picture 96 is using the predicted image 108 included in the B picture 96 and the predicted image 109 included in the P picture 97. Thus, contamination is propagated.

In MPEG, B pictures are not used for prediction of other pictures. Therefore no reference is made to a contaminated region in a B picture when decoding other pictures. Consequently registration of contaminated regions is only carried out for I pictures or P pictures. In other words, in an I or P picture a macro block for which error concealment has been carried out is registered as a contaminated region.

Judging and registering of a contaminated region is carried out by a contaminated region judging portion 16. The configuration of contaminated region judging portion 16 in the present embodiment is largely similar to that shown in FIG. 9. It differs a contaminated region registering and judging portion 31 also makes reference to final prediction direction 15 and to parameter bus 42, and reading instruction 34 and address 35 are supplied not only to contaminated region memory for use with prediction pictures 37 but also to contaminated region memory for use with decoding pictures 36. Reference is made to the parameter bus 42 in order to obtain the on-screen position information of the macro block being decoded.

When the error flag 8 is at 1, the macro block being decoded is judged by the contaminated region registering and judging portion 31 to be a contaminated region and its on-screen position information is registered the contaminated region memory for use with decoding pictures 36. Such registration is carried out only for I and P pictures.

Alternatively, the contamination judging carried out when the error flag 8 is at 0 applies only to P and B pictures. An I picture makes no reference to other pictures, so there is no need to judge contamination for pictures which have been decoded.

Figure 16:
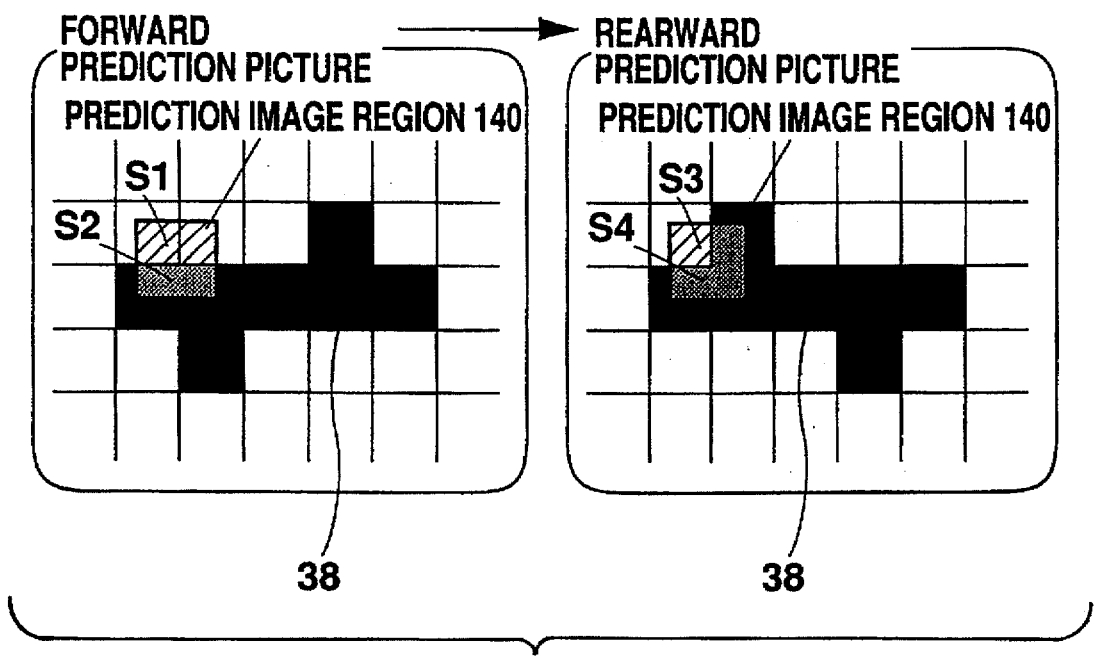
FIG. 16 is a figure depicting processing contents of a contaminated region registering and judging portion 31 for a B picture which has undergone interpolation prediction.

Processing by the contaminated region registering and judging portion 31 for P pictures is the same as that shown in FIG. 10. Two prediction images exist only in cases in which interpolation prediction is carried out at a B picture. FIG. 16 is a figure depicting the processing of the contaminated region registering and judging portion 31 for a B picture which has been composed using interpolation prediction. In both the forward prediction picture and the rearward prediction picture the distribution of the contaminated region 38 is obtained as in the first embodiment. S1~S4 are here defined as follows:

S1 is the portion of the predicted image region 140 in the forward prediction picture which does not overlap with the contaminated region 38 of that picture S2 is the portion of the predicted image region 140 in the forward prediction picture which overlaps with the contaminated region 38 of that picture S3 is the portion of the predicted image region 140 in the rearward prediction picture which does not overlap with the contaminated region 38 of that picture S4 is the portion of the predicted image region 140 in the rearward directional prediction picture which overlaps with the contaminated region 38 of that picture and thus the contaminated region share P2 within the predicted image is $$P2=\{S2/(S1+S2)+S4/(S3+S4)\}/2$$

As in the first embodiment, when P2 satisfies the conditions below, that predicted image is regarded as contaminated.

$$P2>TH \qquad \text{(Equation 2)}$$

Furthermore, in the case when a B picture is created with only forward prediction, P2 is $$P2=S2/(S1+S2)$$

and in the case of only rearward prediction $$P2=S4/(S3+S4).$$

Furthermore, since a B picture which has been composed based on interpolation prediction has two prediction images, the contaminated region memory for use with decoding pictures 36 and the contaminated region memory for use with prediction pictures 37 are both used as contaminated region memories for forward and rearward prediction pictures.

Thereafter, filtering processing is the same as in the first embodiment. As in the first embodiment, the registration of the contaminated regions is also erased after each contaminated region tracking period.

Embodiment 3

A decoding apparatus for decoding and playing back a bit stream which has been coded in compliance with MPEG 2 video stipulations will now be explained. This differs from MPEG 1 in that one mode can be selected from a plurality of motion compensation prediction modes when coding.

[Configuration]

The configuration of this apparatus is largely identical to that shown in FIG. 12 but differs in that a motion compensation prediction mode is supplied between the motion vector selection portion 14 and the contaminated region judging portion 16.

The data configuration for a bit stream which complies with MPEG 2 video stipulations is the same as that shown in FIG. 13. A picture is defined as a frame or a field type and the distinction is termed the picture configuration, the former being a frame picture and the latter a field picture. In MPEG 2, like in MPEG 1, there are 3 types of picture: I, B, and P.

The coding method for an I picture is largely similar to the method in MPEG 1. For a P picture the prediction direction is the same as in MPEG 1 except that for a frame picture, a choice can be made among 3 prediction processes for the motion compensation prediction mode: frame prediction, field prediction or dual prime prediction. In addition, for field pictures, a choice can be made among: frame prediction, 16×8 MC prediction or dual prediction. Dual prime prediction is a variation of field prediction in which prediction for 2 fields included in a frame is carried out using an identical parity field and a different parity field. When decoding, this produces a total of 4 (in the case of frame pictures) or 2 (in the case of field pictures) motion vectors.

The prediction direction for B pictures is also the same as that in MPEG 1 but for a frame picture a choice can be made between 2 prediction processes for the motion compensation prediction mode: frame prediction or field prediction. In addition, for field pictures a choice can be made between field prediction or 16×8 MC prediction.

Thus, 2 motion vectors are generated for the single prediction direction only if field prediction is carried out for a frame picture, or if 16×8 MC prediction is carried out for a field picture.

[Operation]

Differences in operation of the apparatus in the second embodiment will now be explained.

[1] Normal Decoding Operation

When the target of the decoding is an inter-coded macro block, the motion vector selection portion 14 latches the motion compensation prediction mode in addition to the motion vector and prediction direction information sent through the parameter bus 42. Reference is made to this motion compensation prediction mode during the following processes.

[2] Decoding Operation when Error is Detected (1) Concealment Processing

In the present embodiment the prediction picture, motion vector and motion compensation prediction mode used for concealing are discussed below for each type of picture.

1. I pictures

In principle, the same as in the second embodiment. However, with regard to the motion compensation prediction mode, if the picture is a frame picture then frame prediction is used, if it is a field picture then field prediction is used. This fixed process is only effective for concealment and when decoding is actually carried out, the motion compensation prediction mode specified at coding must be used.

2. P pictures

The estimated motion vector and prediction picture are the same as in the second embodiment but when there are two motion vectors, the first to be decoded is used. With regard to the motion compensation prediction mode, as with the above-mentioned I picture, if the picture is a frame picture then frame prediction is used, if it is a field picture then field prediction is used. Also as with the above-mentioned I picture, this fixed process is effective only for concealment.

3. B pictures

The same as P pictures.

The motion vector selection portion 14 complies with the above stipulations and outputs a final motion compensation prediction mode in addition to a final motion vector 15 and a final prediction direction 51. The motion vector selection portion 14 in this embodiment differs in that it also latches the picture structure and motion compensation prediction mode of the picture which includes the macro block being decoded.

The motion compensation prediction mode used in concealment is not stored at the motion vector selection portion 14 because it is always determined by the picture structure. When the error flag 8 is at 0, the decoded motion vector, prediction direction and motion compensation prediction mode are output as they are to the final motion vector determining portion 30. When the error flag 8 is at 1, the adequacy of the motion vector is evaluated based on the on-screen position information of that macro block, the estimated motion vector 20, read from the motion vector buffer 26, and on the estimated prediction direction 69. If it judged to be inadequate, the vector value of the final motion vector 15 is set at 0 and the final prediction direction 51 is output as forward. If it is judged to be adequate, then the final motion vector 15, the final estimated prediction direction 51 and the final compensation prediction mode which have been determined based on the picture structure of the picture to which the estimated motion vector 20 and the estimated prediction direction 69 and the macro block belong are output. Thereafter the process is basically similar to that in the second embodiment.

(2) Judging and Filtering of Contaminated Regions

As in the second embodiment, registering of contaminated regions is carried out only for I and P pictures. The configuration of contaminated region judging portion 16 in this embodiment is largely the same as that in the second embodiment. It differs in that contaminated region registering and judging portion 31 also makes reference to motion compensation prediction mode in addition to those references described in the second embodiment.

When the error flag 8 is at 1, the macro block being decoded is regarded as a contaminated region in the contaminated region registering and judging portion 31 and its on-screen position information is registered in the contaminated region memory for use with decoding pictures 36.

Alternatively, when the error flag 8 is at 0, judging is only carried out for P and B pictures. In MPEG 2 there are 3 possible motion compensation prediction modes for the 2 picture structures. Of these, in frame prediction for frame pictures and field prediction and dual prime prediction for field pictures, there will be 1 or 2 prediction images and processing will be the same as that shown in FIG. 16.

Otherwise, in field prediction and dual prime prediction for frame pictures and 16×8 MC prediction for field pictures, there will be 2 or 4 prediction images. A judging method in the case where there are 4 prediction images will now be explained.

Figure 17:
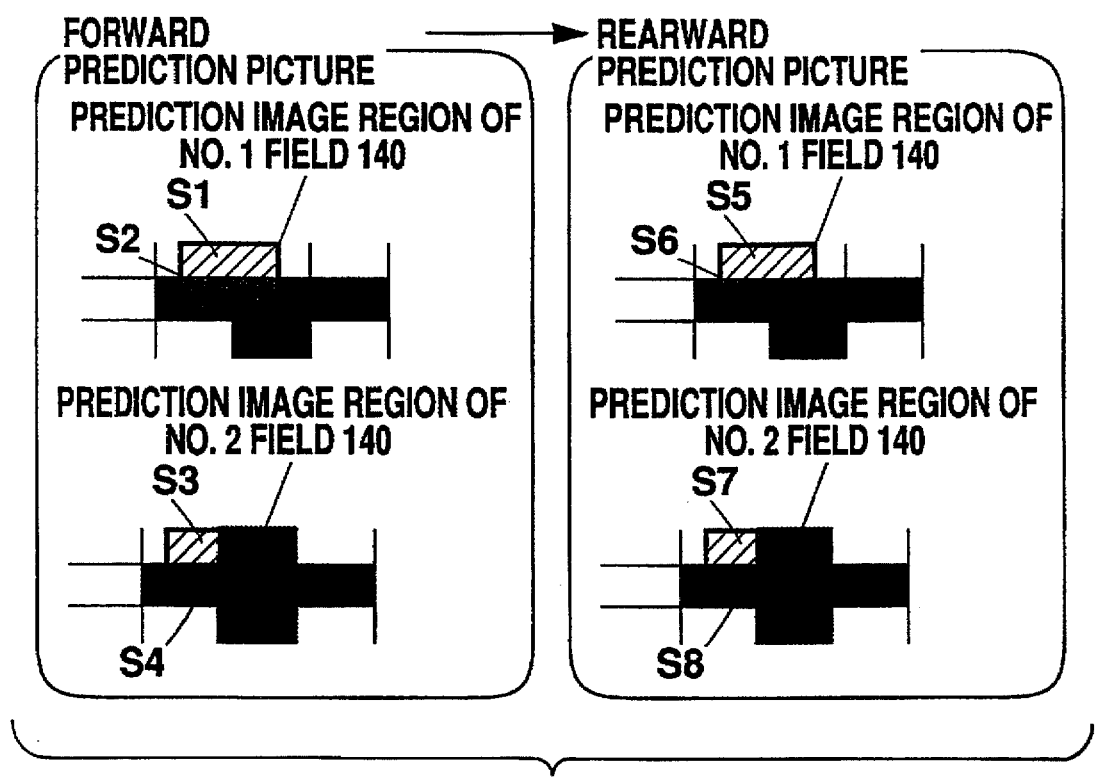
FIG. 17 is a figure showing a judging method according to a contaminated region registering and judging portion 31 in a case where 4 prediction images exist.

FIG. 17 is a figure showing a judging method for contaminated region registering and judging portion 31 in the case where there are 4 prediction images. This figure depicts the case where field prediction is applied to a frame picture. In both the forward prediction picture and the rearward prediction picture, prediction images exist for No. 1 field and No. 2 field. The contaminated region distribution is first obtained for the forward prediction picture and the rearward prediction picture. Here S1 and S2 are defined as:

S1 is the portion of the predicted image region 140 for the No. 1 field in the forward prediction picture which does not overlap with the contaminated region 38 of that picture S2 is the portion of the predicted image region 140 for the No. 1 field in the forward prediction picture which overlaps with the contaminated region 38 of that picture S3~8 are similarly defined as shown in the figure. Thus the contaminated region share P3 of the predicted image is defined to be $$P3=\{S2/(S1+S2)+S4/(S3+S4)+S6/(S5+S6)+S8/(S7+S8)\}/4$$

When P3 satisfies the condition below, that predicted image is regarded as contaminated:

$$P3>TH \qquad \text{(Equation 3)}$$

In only forward prediction $$P3=\{S2/(S1+S2)+S4/(S3+S4)\}/2$$

and in only of rearward directional prediction $$P3=\{S6/(S5+S6)+S8/(S7+S8)\}/2$$

Figure 18:
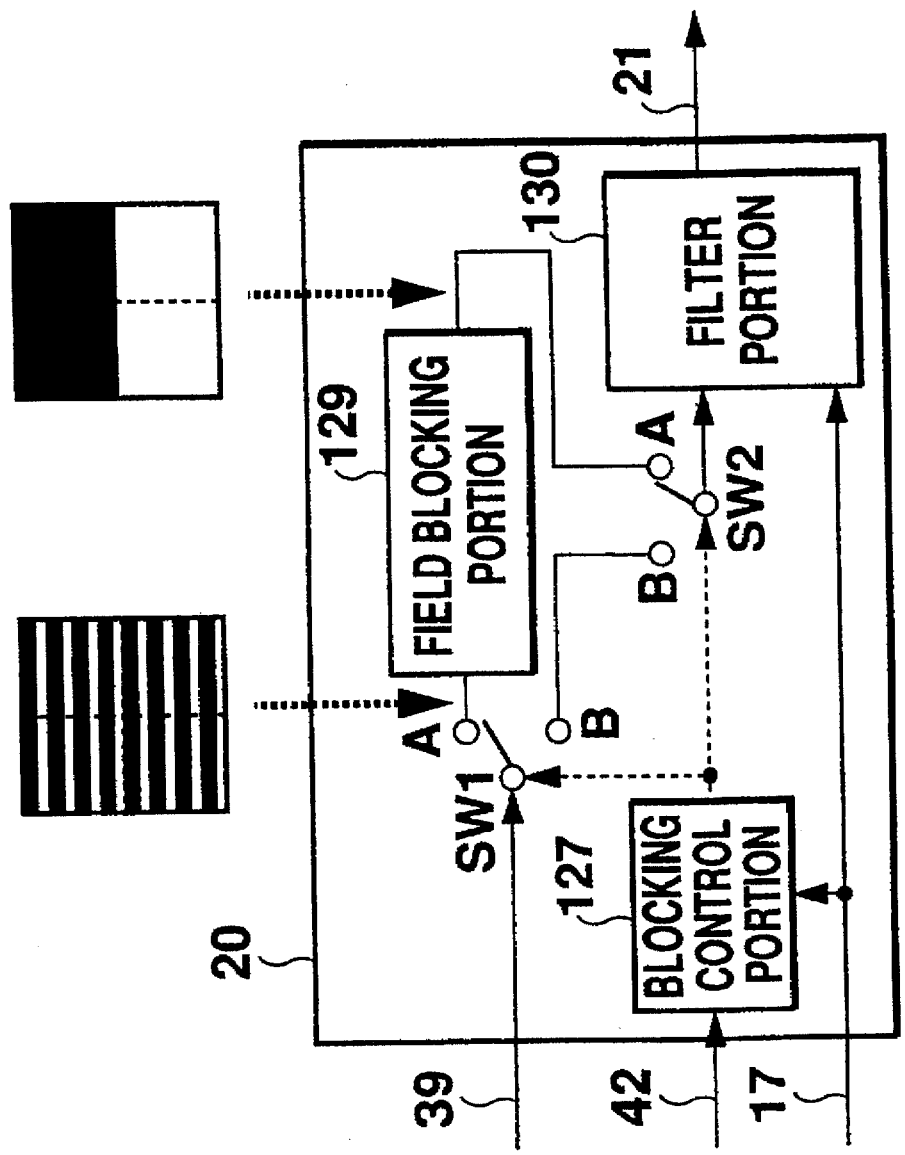
FIG. 18 is an internal configuration figure of a loop filter portion 20 in a third embodiment.

When judging has ended, a filtering process is carried out. In the present embodiment a loop filter portion 20 operates according to the picture structure. FIG. 18 is an internal configuration figure for the loop filter portion 20 in the third embodiment. The loop filter portion 20 consists of a blocking control portion 127 for controlling SW1 and SW2 in compliance with the picture structure and filtering instruction flag 17 latched from the parameter bus 42, a field blocking portion 129 for rearranging a frame format predicted image into field frame format, and a filter portion 130 for filtering of both predicted image which has passed and by-passed the field blocking portion 129. The blocking control portion 127 connects SW1 and SW2 to A only when the picture structure is frame and contaminated region filtering instruction flag 17 is at 1.

In this configuration if the picture structure is frame and contaminated region filtering instruction flag 17 is at 1, the field blocking portion 129 carries out data conversion as shown in the figure. Thereafter, filtering is executed. Consequently even if there is motion between fields when smoothing is carried out (for each white and black portion in the figure) any loss of this motion due to smoothing is averted. After filtering the field format can be returned to frame format by a inverse substituting circuit (not shown in the figure).

The following improvements or modifications to the present embodiment are also envisaged:

1. As in the first and second embodiments the configuration may be such that the registering of contaminated regions is deleted within a certain period.
2. By utilizing a given combination of the apparatuses in embodiments 1~3 a motion image processing apparatus can be provided capable of decoding a bit stream in accordance with any one of the following: ITU-TH.261 stipulations, MPEG 1 video stipulations, MPEG 2 video stipulations.

While there has been described what are at present considered to be preferred embodiments of the invention, it will be understood that various modifications may be made to the present invention and it is intended that the appended claims cover all such modifications as fall within the true spirit and scope of the invention.

What is claimed is:

1. A motion image decoding method for decoding coded motion image data using motion compensation prediction, said method comprising:

an analysis process for analyzing motion image data at each processing unit image;

a registering process for registering a region of a processing unit image as a contaminated region when an error has been detected during analysis of the processing unit image;

a determining process for determining a predicted image to be used for motion compensation prediction when a processing unit image is decoded;

a judging process for judging if the determined predicted image is included in said contaminated region; and a smoothing process for smoothing said predicted image when said predicted image has been judged to be included in said contaminated region.

2. A motion image decoding method according to claim 1, wherein said registering process registers not only a region of the processing unit image in which an error has been detected but also a region for which motion compensation prediction has been carried out using the predicted image which is included in the contaminated region.

3. A motion image decoding method according to claim 1, wherein said smoothing process uses filtering using a low-pass filter.

4. A motion image decoding apparatus for decoding coded motion image data using motion compensation prediction, said apparatus comprising:

a bit stream analysis portion for receiving motion image data and analyzing each processing unit image of said motion image data;

a contaminated region registering portion for registering a region of a processing unit image as a contaminated region when an error has been detected during analysis of the processing unit image;

a predicted image determining portion for determining a predicted image to be used for motion compensation prediction when a processing unit image is decoded;

a contamination judging portion for judging if the predicted image is contaminated by comparing a region of the determined predicted image with said contaminated region; and a smoothing portion for smoothing said predicted image when said predicted image has been judged to be included in said contaminated region.

5. A motion image decoding apparatus according to claim 4, wherein said predicted image determining portion carries out motion compensation prediction by using a motion vector for said each processing unit image and determines a predicted image for a processing unit image which has lost its motion vector due to an error based on a motion vector of a processing unit image in close proximity.

6. A motion image decoding apparatus according to claim 4, further comprising a picture counting portion for counting the number of decoded pictures, wherein when the number of pictures counted has reached a designated value, said contaminated region registering portion erases registration of the contaminated region.

7. A motion image decoding apparatus according to claim 4, wherein said contaminated region registering portion registers not only a region of the processing unit image in which an error has been detected but also a region for which motion compensation prediction has been carried out using the predicted image which is included in the contaminated region.

8. A motion image decoding apparatus according to claim 4, further comprising a loss image extent determining portion for determining when an error has been detected an extent of an image region which has lost its motion vector as a result of the error; wherein said contaminated region registering portion registers the image region as the contaminated region.

9. A motion image decoding apparatus according to claim 4, further comprising a contaminated region memory portion for use with decoding pictures and a contaminated region memory portion for use with prediction pictures, such that when an error is detected in a picture presently being decoded, said contaminated region registering portion registers the processing unit image in which the error has been detected in the contaminated region memory portion for use with decoding pictures, and which, when the decoding processing has proceeded to the next picture, switches the contaminated region memory portion for use with decoding pictures with the contaminated region memory portion for use with prediction pictures.

10. A motion image decoding apparatus according to claim 4, further comprising:

a picture configuration judging portion for judging whether the configuration of a picture is in frame format or in field format;

a picture configuration converting portion for converting a picture configuration which is in the frame format to a configuration in the field format; wherein when a picture configuration is in the frame format, said smoothing process is carried out only after the configuration has been converted to the field format.

11. A motion image decoding apparatus according to claim 4, wherein said smoothing portion comprises a low-pass filter.

12. A motion image decoding apparatus according to claim 11, wherein said low-pass filter also operates as an in-loop filter when decoding procedures for the apparatus involve moving image coding stipulations which stipulate the installation of a loop filter.

13. A motion image decoding apparatus according to claim 4, wherein said contamination judging portion judges the existence of contamination from a level of overlap of the region of said predicted image and said contaminated region.

14. A motion image decoding apparatus according to claim 13, wherein in the case where a plurality of prediction images exist for one processing unit image, said contamination judging portion judges the existence of contamination from the average of the level of overlap between each of the plurality of prediction images and said contaminated region.

* * * * *